United States Patent
Chan et al.

(10) Patent No.: US 8,244,067 B2
(45) Date of Patent: Aug. 14, 2012

(54) CONSTELLATION DETECTION

(75) Inventors: Michael Chun Tao Chan, Macquarie Park (AU); Eric Lap Min Cheung, Epping (AU); Dmitri Katchalov, Neutral Bay (AU); Kapil Batra, Westmead (AU); Stephen Edward Ecob, Chatswood West (AU)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 12/325,528

(22) Filed: Dec. 1, 2008

(65) Prior Publication Data

US 2009/0161957 A1    Jun. 25, 2009

(30) Foreign Application Priority Data

Dec. 20, 2007   (AU) ............................... 2007254595

(51) Int. Cl.
*G06K 9/36* (2006.01)
(52) U.S. Cl. .................... 382/287; 382/100; 358/3.28
(58) Field of Classification Search .................. 235/375, 235/494; 358/1.8, 1.9, 1.18, 3.28; 375/260, 375/341; 382/100, 141; 714/758; 717/106
See application file for complete search history.

(56) References Cited

U.S. PATENT DOCUMENTS

| 5,860,679 | A  |   | 1/1999 | Fukuda et al. ............... 283/70 |
| 5,892,846 | A  |   | 4/1999 | Davis |
| 5,911,001 | A  | * | 6/1999 | Kawada .................... 382/141 |
| 6,548,768 | B1 | * | 4/2003 | Pettersson et al. ....... 178/18.01 |
| 6,901,236 | B2 | * | 5/2005 | Saitoh et al. ............... 399/366 |
| 6,929,183 | B2 |   | 8/2005 | Pettersson ............. 235/462.25 |
| 7,548,340 | B2 | * | 6/2009 | Ishikawa et al. ............. 358/1.9 |
| 7,609,851 | B2 | * | 10/2009 | Guan et al. ................. 382/100 |
| 8,031,375 | B2 | * | 10/2011 | Yoshida ..................... 358/3.28 |

(Continued)

FOREIGN PATENT DOCUMENTS

AU    2003246012    4/2004

(Continued)

OTHER PUBLICATIONS

Notice of Acceptance, dated Mar. 28, 2011, issued by the Australian Patent Office, in counterpart Australian Patent Application No. 2007254595.

(Continued)

*Primary Examiner* — Vu Le
*Assistant Examiner* — Xuemei Chen
(74) *Attorney, Agent, or Firm* — Fitzpatrick, Cella, Harper & Scinto

(57) ABSTRACT

Disclosed herein is a method for identifying a constellation of alignment marks within an arrangement of computer readable marks in an image (1412), the arrangement of computer readable marks (1412) including alignment marks (1401-1406) and data carrying marks (1407-1410). The alignment marks (1401-1406) define a reference grid within the arrangement of computer readable marks and the data carrying marks (1407-1410) are modulated with respect to the reference grid to encode data. The method selects at least two marks (1501, 1502) from the arrangement of computer readable marks and determines a rotation center with reference to the selected marks (1501, 1502). The method then determines rotated positions for the selected marks by rotating each of the selected marks by a predetermined angle about the rotation center. For each rotated position, a mark having a position that is less than a predetermined threshold from the rotated position is located from the arrangement of marks and then the selected marks and the located marks are identified as the constellation of alignment marks.

14 Claims, 33 Drawing Sheets

U.S. PATENT DOCUMENTS

| | | | |
|---|---|---|---|
| 8,107,129 B2 * | 1/2012 | Yang et al. | 358/3.28 |
| 2002/0023247 A1 * | 2/2002 | Akiyama et al. | 714/758 |
| 2004/0109184 A1 * | 6/2004 | Ishii | 358/1.9 |
| 2005/0104861 A9 | 5/2005 | Pettersson et al. | 345/173 |
| 2005/0254606 A1 * | 11/2005 | Alamouti | 375/341 |
| 2006/0019352 A1 | 1/2006 | Blanche et al. | 435/86 |
| 2006/0242622 A1 * | 10/2006 | Wang et al. | 717/106 |
| 2007/0057074 A1 * | 3/2007 | Cheung et al. | 235/494 |
| 2007/0064973 A1 * | 3/2007 | Meaney | 382/100 |
| 2008/0043258 A1 * | 2/2008 | Yoshida | 358/1.8 |
| 2008/0149722 A1 | 6/2008 | Cheung et al. | |
| 2008/0225965 A1 * | 9/2008 | Pi et al. | 375/260 |
| 2009/0059299 A1 * | 3/2009 | Yoshida | 358/1.18 |
| 2009/0159658 A1 * | 6/2009 | Cheung et al. | 235/375 |
| 2009/0284775 A1 * | 11/2009 | Muramatsu | 358/1.9 |
| 2010/0014122 A1 | 1/2010 | Massicot et al. | |
| 2010/0188670 A1 * | 7/2010 | Otake | 358/1.2 |
| 2010/0201114 A1 * | 8/2010 | Fields et al. | 283/70 |
| 2010/0220364 A1 | 9/2010 | Picard et al. | |
| 2011/0038012 A1 | 2/2011 | Massicot et al. | |
| 2011/0063642 A1 * | 3/2011 | Greim | 358/1.9 |

FOREIGN PATENT DOCUMENTS

| | | |
|---|---|---|
| AU | 2005209709 | 3/2007 |
| AU | 2006252239 | 7/2008 |
| WO | WO 2007/004994 | 1/2007 |
| WO | 2007/138201 | 12/2007 |

OTHER PUBLICATIONS

Examiner's Report, issued on Mar. 26, 2010, in Australian Patent Application No. 2007254595.

* cited by examiner

CONSTELLATION DETECTION

FIELD OF THE INVENTION

The present invention relates generally to the tracking of marks in printed documents and, in particular, to the tracking of alignment marks forming grid-like patterns. The present invention also relates generally to the determination of the orientation of watermarks or other steganographic patterns, including the detection of watermarks with the aid of error correcting codes. The present invention further relates generally to detecting basic constellations of alignment marks present in the form of a grid on printed documents.

BACKGROUND

Computer readable marks on printed pages are commonplace, with many varieties, such as the common barcode, in extremely widespread use. Although the common barcode is ubiquitous, an increasing number of alternative computer readable marks are reaching the marketplace. Many of these new varieties of marks provide much greater data carrying capacity than the common barcode, enabling a wider range of applications than is possible with the limiting 30 to 60 bits of data that can be stored in a common barcode. Other varieties of marks improve on the common barcode by exhibiting reduced visibility, which has the advantage that a larger portion of the page is left free to contain human-readable content. An additional advantage of low visibility marks is that information can be hidden in a page, enabling applications such as siteganography and watermarking.

As wider use is made of computer readable marks, and new applications for computer readable marks are found, there is an increasing need for marks that provide a high data content without consuming large areas of the page. Such marks leave most of the page free to contain human-readable content, which is desirable for many applications.

When recovering watermarks or other steganographs from images, the problem of determining the correct orientation for reading the mark arises, because the marks are by definition obscured from sight, and hence will often be scanned or otherwise digitized with a random orientation.

Many methods for determining the correct orientation of steganographs have been disclosed, such as incorporating and later detecting multiple one dimensional orientation signals into the image. Even if these signals are only weakly embedded, to the point where the signals may be imperceptible to the human eye, an appropriately oriented projection of the image will reveal the presence of a one dimensional carrier, as described in Australian Patent Application Serial No. 2002951815 (Canon Kabushiki Kaisha).

Australian Patent Application No. 2005209709 (Canon Kabushiki Kaisha) describes another form of steganograph that uses a fixed header message in a predetermined location to aid in the determination of orientation.

The addition of orientation signals to steganographs is a well known technique that allows for the ready determination of orientation at the expense of increased visibility. When producing steganographs where visibility must be minimised, the presence of such orientation signals is undesirable.

Several methods for preventing unauthorized copying of image data exist. These methods are usually based on locating fixed patterns or indicia in an image that is to be copied. Alternatively, some methods have data encoded with reference to a virtual grid. A need exists to remove the need for having a fixed distance grid, and provide a faster methodology to detect a reference grid and separate the reference grid from data carrying dots. A further need exists to provide a faster methodology to detect a reference grid by selectively evaluating only the marks forming grid-like reference patterns while ignoring data-carrying marks.

SUMMARY

Disclosed herein is a method for identifying a constellation of alignment marks within an arrangement of computer readable marks in an image. In one embodiment, the arrangement of computer readable marks is a subset of marks forming a low visibility barcode in an image.

According to a first aspect of the present disclosure, there is provided a computer-implemented method for identifying a constellation of alignment marks within an arrangement of computer readable marks in an image, the arrangement of computer readable marks including alignment marks and data carrying marks, wherein the alignment marks define a reference grid within the arrangement of computer readable marks and the data carrying marks are modulated with respect to the reference grid to encode data. The method includes the steps of: selecting at least two marks from the arrangement of computer readable marks; determining a rotation center with reference to respective positions of the selected marks; determining rotated positions for the selected marks by rotating each of the selected marks by a predetermined angle about the rotation center; locating from the arrangement of computer readable marks, for each rotated position, a mark having a position that is less than a predetermined threshold from the rotated position; and identifying the selected marks and the located marks as the constellation of alignment marks. The method then stores the identified constellation for use in decoding the data carrying marks.

According to a second aspect of the present disclosure, there is provided a computer-implemented method for identifying a constellation of alignment marks within an arrangement of computer readable marks in an image, the arrangement of computer readable marks including alignment marks and data carrying marks, wherein the alignment marks define a reference grid within the arrangement of computer readable marks and the data carrying marks are modulated with respect to the reference grid to encode data. The method includes the steps of: for at least one combination of at least two marks selected from the arrangement of computer readable marks; (a) determining a rotation center with reference to respective positions of the selected marks in the combination; (b) determining rotated positions for the selected marks in the combination by rotating each of the selected marks by a predetermined angle about the rotation center; (c) locating from the arrangement of computer readable marks, for each rotated position, a mark nearest to the rotated position; and (d) identifying the selected marks in the combination and the located marks as the constellation of alignment marks, when, for at least a predetermined proportion of the rotated positions, the mark nearest to the rotated position is less than a predetermined threshold from the rotated position. The method stores the identified constellation for use in decoding the data carrying marks.

According to a third aspect of the present disclosure, there is provided a photocopier adapted to identify a constellation of alignment marks within an arrangement of computer readable marks in a scanned image, the arrangement of computer readable marks including alignment marks and data carrying marks, wherein the alignment marks define a reference grid within the arrangement of computer readable marks and the data carrying marks are modulated with respect to the reference grid to encode data. The photocopier includes: a scanner for acquiring the scanned image; a storage device for storing a computer program; and a processor for executing the program. The program includes: code for selecting at least two marks from the arrangement of computer readable marks; code for determining a rotation center with reference to respective positions of the selected marks; code for determining rotated positions for the selected marks by rotating each of the selected marks by a predetermined angle about the rotation center; code for locating from the arrangement of computer readable marks, for each rotated position, a mark having a position that is less than a predetermined threshold from the rotated position; and code for identifying the selected marks and the located marks as the constellation of alignment marks.

According to a fourth aspect of the present disclosure, there is provided a computer program product including a computer readable medium having recorded thereon a computer program for directing a processor to execute a method for identifying a constellation of alignment marks within an arrangement of computer readable marks in an image, the arrangement of computer readable marks including alignment marks and data carrying marks. The alignment marks define a reference grid within the arrangement of computer readable marks and the data carrying marks are modulated with respect to the reference grid to encode data. The method includes the steps of: code for selecting at least two marks from the arrangement of computer readable marks; code for determining a rotation center with reference to respective positions of the selected marks; code for determining rotated positions for the selected marks by rotating each of the selected marks by a predetermined angle about the rotation center; code for locating from the arrangement of computer readable marks, for each rotated position, a mark having a position that is less than a predetermined threshold from the rotated position; and code for identifying the selected marks and the located marks as the constellation of alignment marks.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the present disclosure are also disclosed.

BRIEF DESCRIPTION OF THE DRAWINGS

One or more embodiments of the present invention will now be described with reference to the drawings, in which.

DETAILED DESCRIPTION

Figure 1:
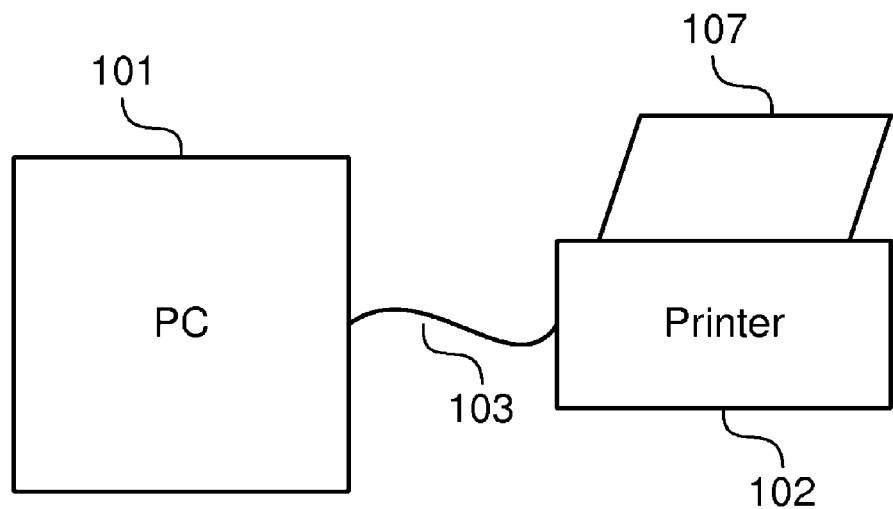
FIG. 1 is a schematic block diagram representation of equipment suitable for printing low visibility barcodes (LVBCs)

Where reference is made in any one or more of the accompanying drawings to steps and/or features that have the same reference numerals, those steps and/or features have for the purposes of this description the same function(s) or operation(s), unless the contrary intention appears.

Overview

Disclosed herein is a computer-implemented method for identifying a constellation of alignment marks within an arrangement of computer readable marks in an image. The image may be, for example, but is not limited to, a printed image or a scanned image acquired by a scanner or photocopier. In one embodiment, the arrangement of computer readable marks is a subset of marks forming a low visibility barcode in the image. The computer readable marks may include, for example, dots, circles, squares, triangles, or groups of dots forming any desired shape. The arrangement of computer readable marks includes alignment marks and data carrying marks, wherein the alignment marks define a virtual reference grid within the arrangement of computer readable marks and the data carrying marks are modulated with respect to the reference grid to encode data.

The method selects at least two marks from the arrangement of computer readable marks and determines a rotation center with reference to respective positions of the selected marks. Rotated positions are then determined for the selected marks by rotating each of the selected marks by a predetermined angle about the rotation center. The method then locates, from the arrangement of computer readable marks and for each rotated position, a mark having a position that is less than a predetermined threshold from the rotated position. The method identifies the selected marks and the located marks as the constellation of alignment marks and then stores the identified constellation for use in decoding the data carrying marks. In one embodiment, further selections of at least two marks occur to identify the constellation.

In one embodiment, the method further includes determining a spacing and orientation of the identified constellation and then determining a set of expected mark locations, based on the spacing and orientation of the identified constellation. The identified constellation of alignment marks is verified when at least a predetermined proportion of the expected mark locations match locations of marks in the arrangement of computer readable marks.

In another embodiment, the reference grid defined by the alignment marks is a rectangular grid, two marks are selected from the arrangement of computer readable marks, and determining the rotation center includes identifying a point located half-way between the two selected marks. In a further embodiment, the reference grid is a triangular grid and determining the rotation center includes assigning one of the selected marks as the rotation center. In a yet further embodiment, the reference grid is a hexagonal grid or a diamond grid.

In another embodiment, the method expands the identified constellation to incorporate additional marks from the arrangement of computer readable marks, based on the determined spacing and orientation. In a still further embodiment, the method utilises the identified constellation to identify the reference grid and identifies the data carrying marks in the arrangement of computer readable marks, based on the identified reference grid. Finally, the method demodulates the identified data carrying marks to derive data encoded by the data carrying marks.

Further disclosed herein is a computer-implemented method for identifying a constellation of alignment marks within an arrangement of computer readable marks in an image. The image may be, for example, but is not limited to, a printed image or a scanned image acquired by a scanner or photocopier. In one embodiment, the arrangement of computer readable marks is a subset of marks forming a low visibility barcode in the image. The computer readable marks may include, for example, dots, circles, squares, triangles, or groups of dots forming any desired shape. The arrangement of computer readable marks includes alignment marks and data carrying marks, wherein the alignment marks define a virtual reference grid within the arrangement of computer readable marks and the data carrying marks are modulated with respect to the reference grid to encode data.

For at least one combination of at least two marks selected from the arrangement of computer readable marks, the method determines a rotation center with reference to respective positions of the selected marks in the combination and then determines rotated positions for the selected marks in the combination by rotating each of the selected marks by a predetermined angle about the rotation center. The method locates from the arrangement of computer readable marks, for each rotated position, a mark nearest to the rotated position and identifies the selected marks in the combination and the located marks as the constellation of alignment marks, when, for at least a predetermined proportion of the rotated positions, the mark nearest to the rotated position is less than a predetermined threshold from the rotated position. The predetermined threshold depends on the particular application. The method stores the identified constellation for use in decoding the data carrying marks.

Further disclosed herein is a photocopier adapted to identify a constellation of alignment marks within an arrangement of computer readable marks in a scanned image. The arrangement of computer readable marks includes alignment marks and data carrying marks, wherein the alignment marks define a reference grid within the arrangement of computer readable marks and the data carrying marks are modulated with respect to the reference grid to encode data. The photocopier includes a scanner for acquiring the scanned image, a storage device for storing a computer program, and a processor for executing the program. The computer program includes code for selecting at least two marks from the arrangement of computer readable marks, code for determining a rotation center with reference to respective positions of the selected marks, code for determining rotated positions for the selected marks by rotating each of the selected marks by a predetermined angle about the rotation center, code for locating from the arrangement of computer readable marks, for each rotated position, a mark having a position that is less than a predetermined threshold from the rotated position; and code for identifying the selected marks and the located marks as the constellation of alignment marks.

Also disclosed herein is a computer program product including a computer readable medium having recorded thereon a computer program for directing a processor to execute any one of the aforementioned methods.

Determination of Orientation of Watermarks

Low Visibility Bar Codes, herein abbreviated to LVBC, are a variety of computer readable marks that can be printed onto pages using normal printers (such as laser printers or inkjet printers) and can be computer read through the use of a normal desktop scanner. LVBC marks can be used to contain binary data of tens, hundreds or even thousands of bytes per page, whilst leaving a majority of the page free to contain human-readable content. LVBC marks can be configured to contain a large amount of redundancy, and when this is done LVBC marks are highly robust to folding, wrinkling, staining, tearing and defacement.

FIG. 1 is a schematic block diagram representation of equipment suitable for printing LVBCs. A personal computer 101, for example an IBM compatible PC running the Microsoft Windows™ operating system, is coupled to a printer 102, such as a laser printer or inkjet printer, through a communications cable 103. The printer 102 is able to print on a piece of paper 107 or other print medium to provide a hard copy document. The data printed may include an LVBC. In an alternate embodiment, the communications cable 103 is implemented using a wireless transmission link.

Figure 2:
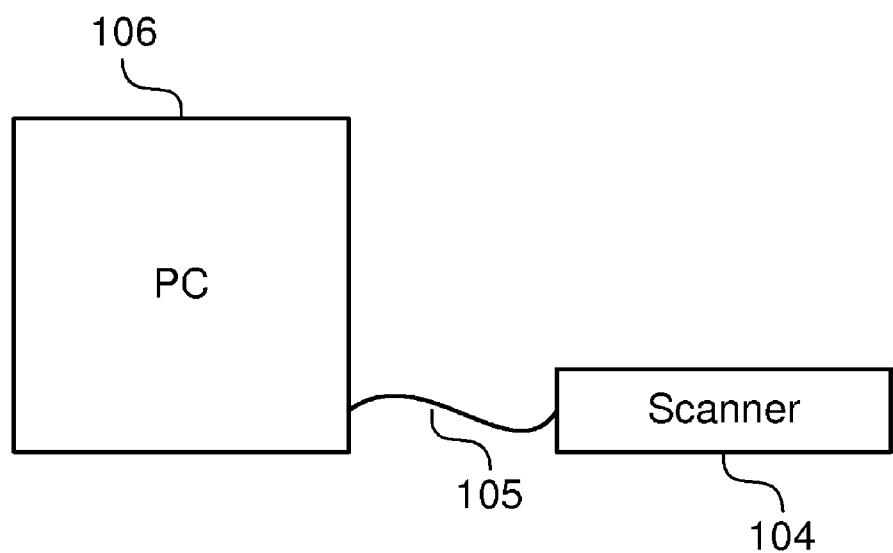
FIG. 2 is a schematic block diagram representation of equipment suitable for computer reading of LVBCs.

FIG. 2 is a schematic block diagram representation of equipment suitable for computer reading of LVBCs. FIG. 2 shows a scanner 104, such as a Canon 9900F desktop scanner, which is coupled to a personal computer 106 through a communications cable 105. The personal computers 106 and 101 may be the same computer, or alternatively the personal computers 106 and 101 may be separate computers, operable independently or, for example, connected via a computer network. The equipment is suitable for computer reading of LVBCs, for example existing on a hard copy document scanned by the scanner 104 into the computer 106. In an alternate embodiment, the communications cable 105 is implemented using a wireless transmission link.

Figure 9:
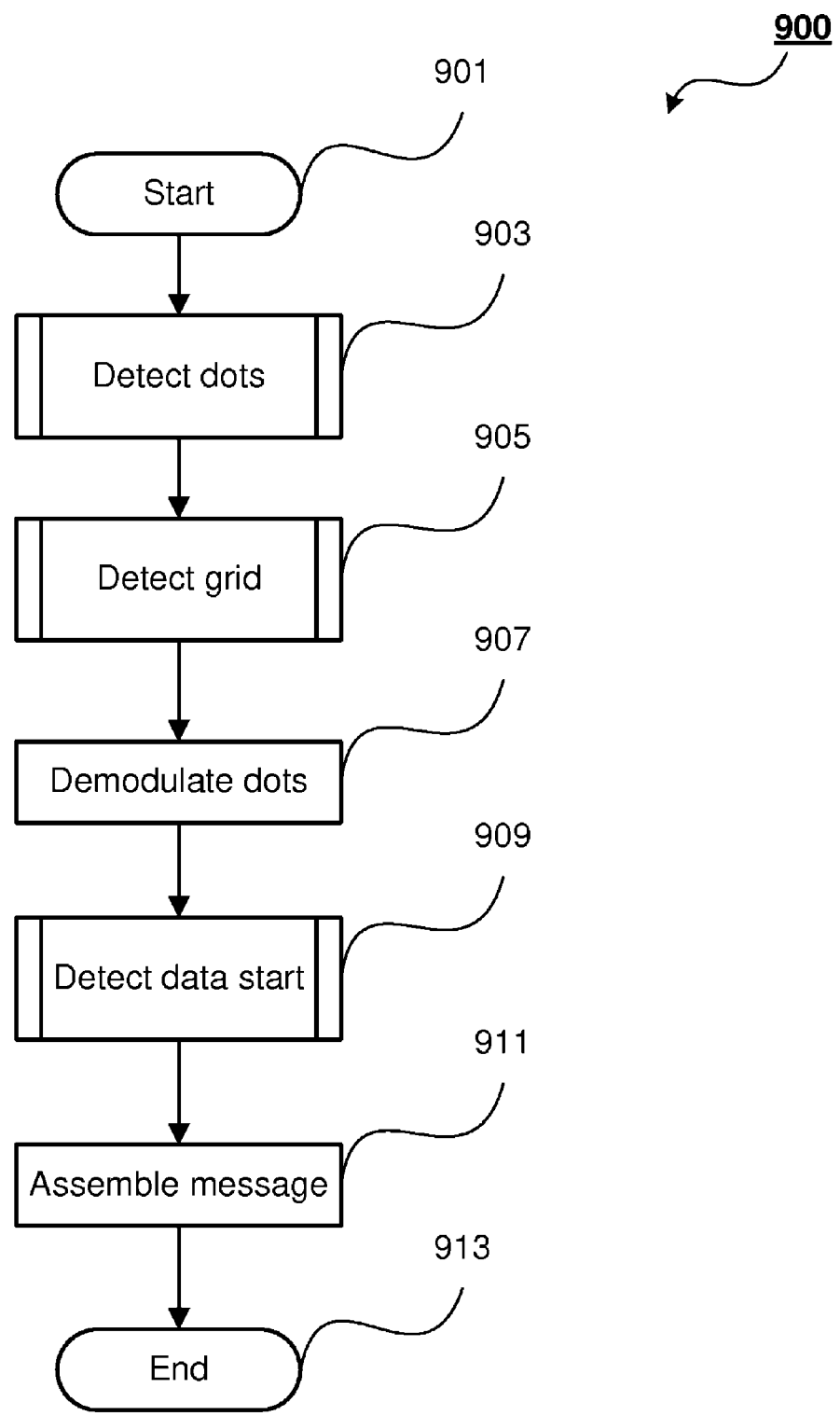
FIG. 9 is a flow diagram of a method for decoding LVBC data.
Figure 10:
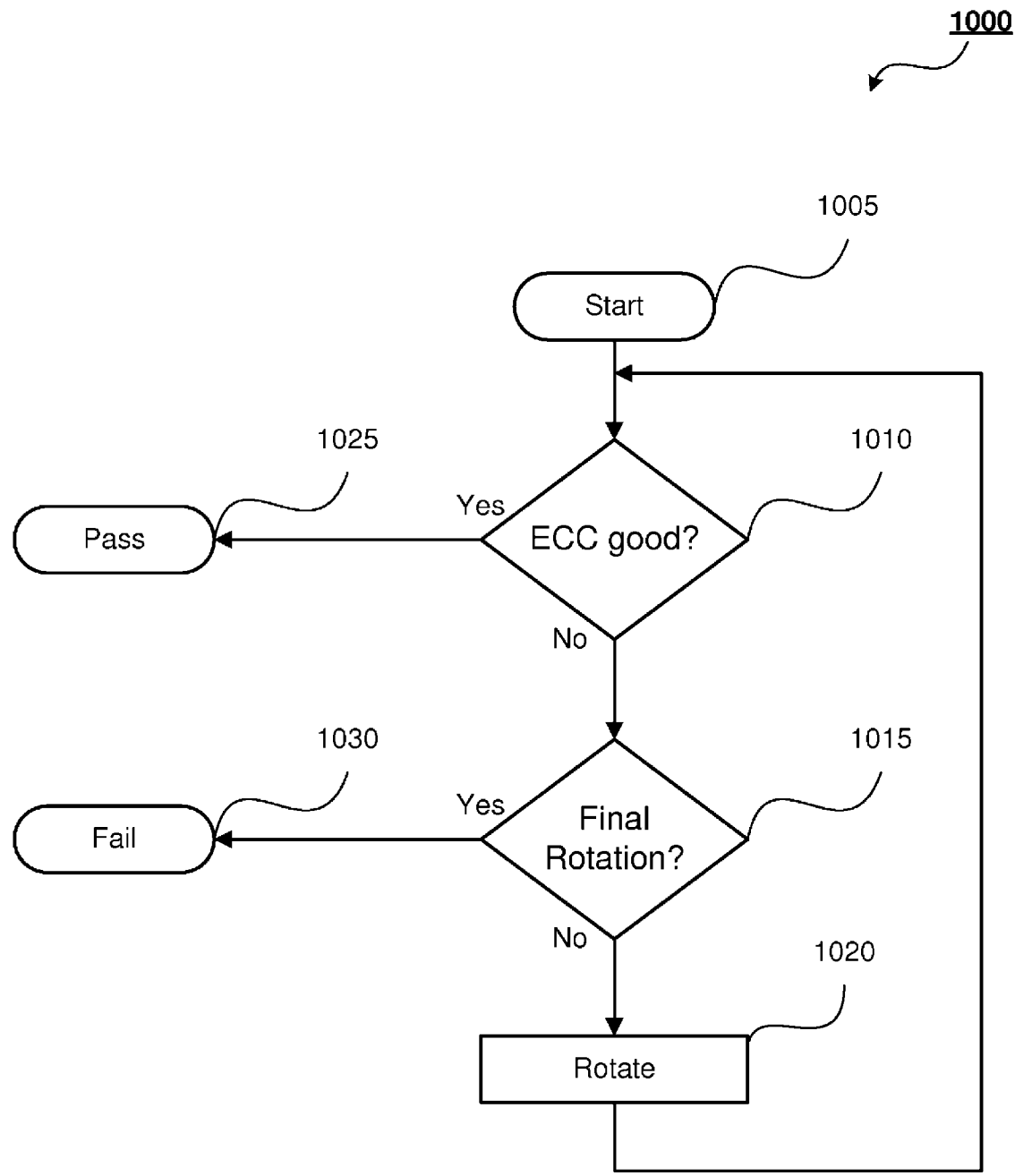
FIG. 10 is a flow diagram of a method for determining the correct orientation of an LVBC.
Figure 11:
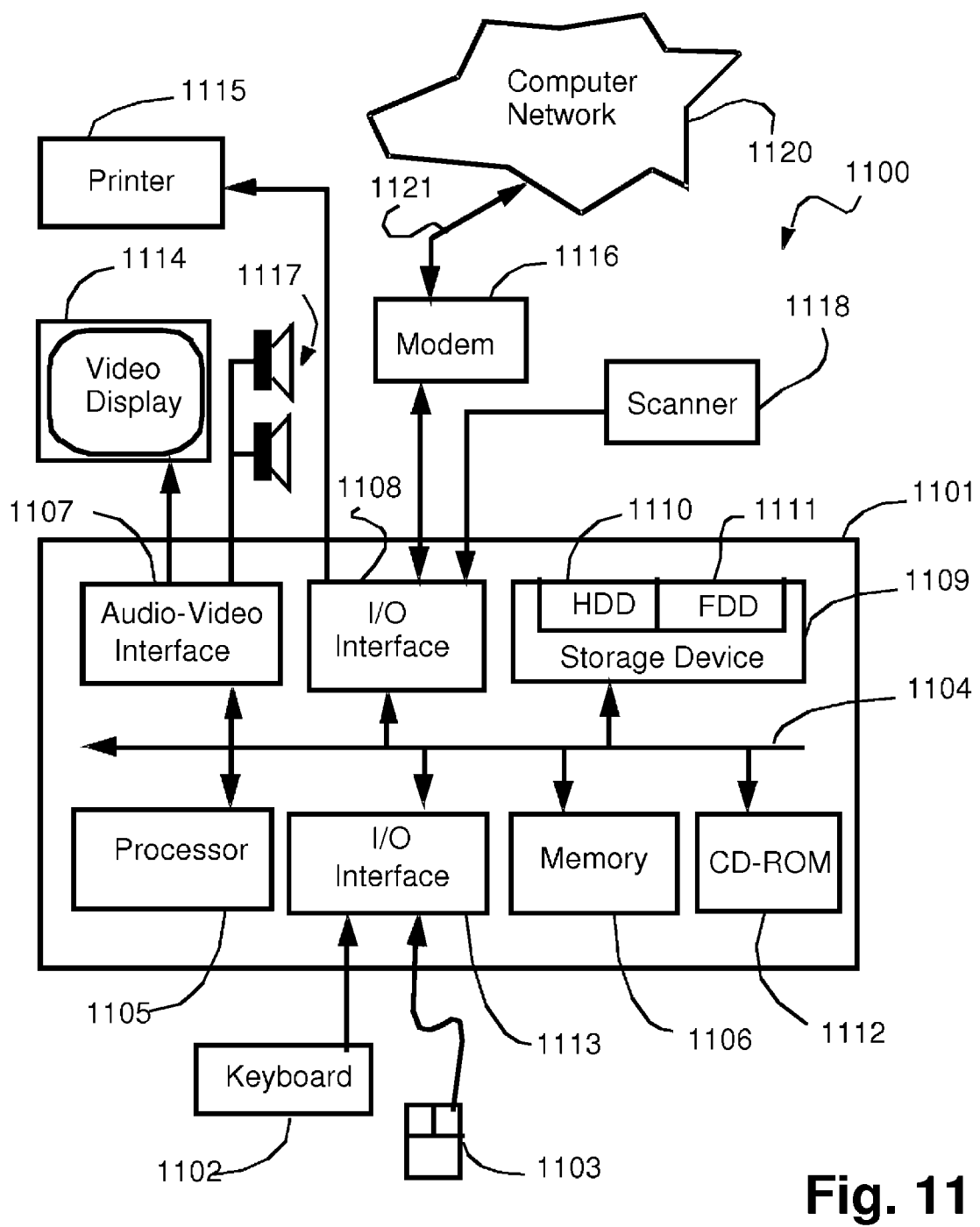
FIG. 11 is a schematic block diagram representation of a computer system in which the arrangements described can be practiced.

The methods of encoding and decoding to be described are preferably practiced using a general-purpose computer system 1100, such as that shown in FIG. 11, wherein the processes of FIGS. 3-10 may be implemented as software, such as an application program executing within the computer system 1100. In particular, the steps of encoding and decoding are effected by instructions in the software that are carried out by the computer. The instructions may be formed as one or more code modules, each for performing one or more particular tasks. The software may also be divided into two separate parts, in which a first part performs the encoding and/or decoding methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for incorporating data into a document.

The computer system 1100 is formed by a computer module 1101, input devices such as a keyboard 1102, mouse 1103 and scanner 1118, and output devices including a printer 1115, a display device 1114 and loudspeakers 1117. A Modulator-Demodulator (Modem) transceiver device 1116 is used by the computer module 1101 for communicating to and from a communications network 1120, for example connectable via a telephone line 1121 or other functional medium. The modem 1116 can be used to obtain access to the Internet, and other network systems, such as a Local Area Network (LAN) or a Wide Area Network (WAN), and may be incorporated into the computer module 1101 in some implementations.

The computer module 1101 typically includes at least one processor unit 1105, and a memory unit 1106, for example formed from semiconductor random access memory (RAM) and read only memory (ROM). The module 1101 also includes an number of input/output (I/O) interfaces including an audio-video interface 1107 that couples to the video display 1114 and loudspeakers 1117, an I/O interface 1113 for the keyboard 1102 and mouse 1103 and optionally a joystick (not illustrated), and an interface 1108 for the modem 1116, scanner 1118 and printer 1115. In some implementations, the modem 1116 may be incorporated within the computer module 1101, for example within the interface 1108. A storage device 1109 is provided and typically includes a hard disk drive 1110 and a floppy disk drive 1111. A magnetic tape drive (not illustrated) may also be used. A CD-ROM drive 1112 is typically provided as a non-volatile source of data. The components 1105 to 1113 of the computer module 1101, typically communicate via an interconnected bus 1104 and in a manner which results in a conventional mode of operation of the computer system 1100 known to those in the relevant art. Examples of computers on which the described arrangements can be practiced include IBM-PCs and compatibles, Sun Sparcstations, or alike computer systems evolved therefrom.

Typically, the application program is resident on the hard disk drive 1110 and read and controlled in its execution by the processor 1105. Intermediate storage of the program and any data fetched from the network 1120 may be accomplished using the semiconductor memory 1106, possibly in concert with the hard disk drive 1110. In some instances, the application program may be supplied to the user encoded on a CD-ROM or floppy disk and read via the corresponding drive 1112 or 1111, or alternatively may be read by the user from the network 1120 via the modem device 1116. Still further, the software can also be loaded into the computer system 1100 from other computer readable media. The term "computer readable medium" as used herein refers to any storage or transmission medium that participates in providing instructions and/or data to the computer system 1100 for execution and/or processing. Examples of computer readable storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1101. Examples of computer readable transmission media include radio or infrared transmission channels as well as a network connection to another computer or networked device, and the Internet or Intranets including e-mail transmissions and information recorded on Websites and the like.

The application program is operative when scanning information into the computer 1101 from the scanner 1118, and also when printing to the printer 1115.

Basic Structure of LVBC

Figure 3:
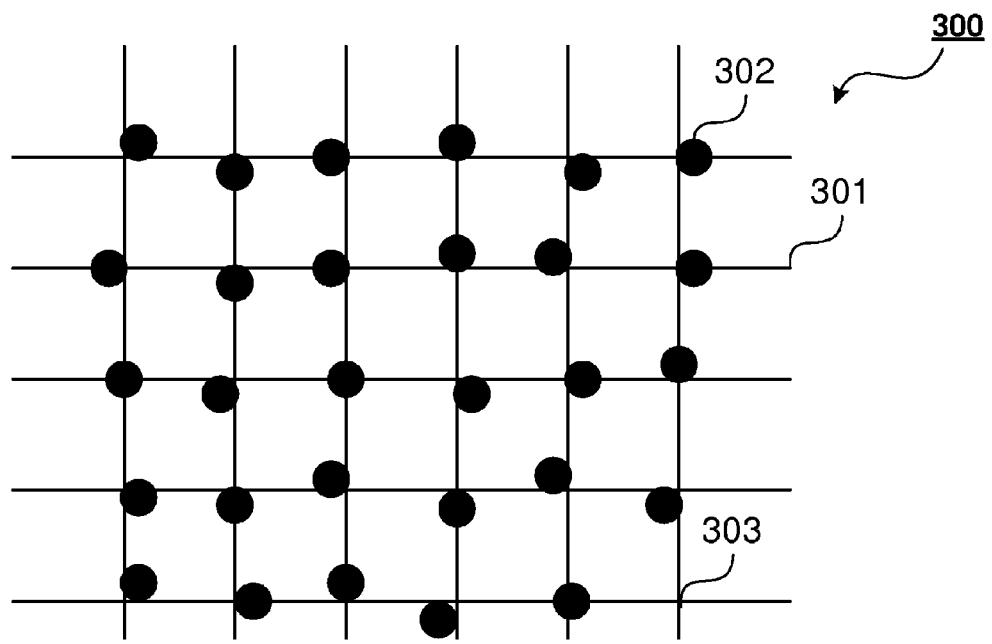
FIG. 3 illustrates an array of dots that have been phase modulated so that the dots no longer lie entirely on a regular grid.

FIG. 3 shows an enlarged view of an appearance of an LVBC 300. The LVBC 300 is formed by a large number of dots 302 that lie close to intersection points 303 of a square grid 301. Note that it is only the dots 302 that form the visible LVBC 300. The grid 301 is illustrated purely for explanation of the location of the dots 302 and may be considered "virtual" as a consequence. The appearance of an LVBC 300 is similar to that of a regular grid of dots, but not identical.

Figure 4:
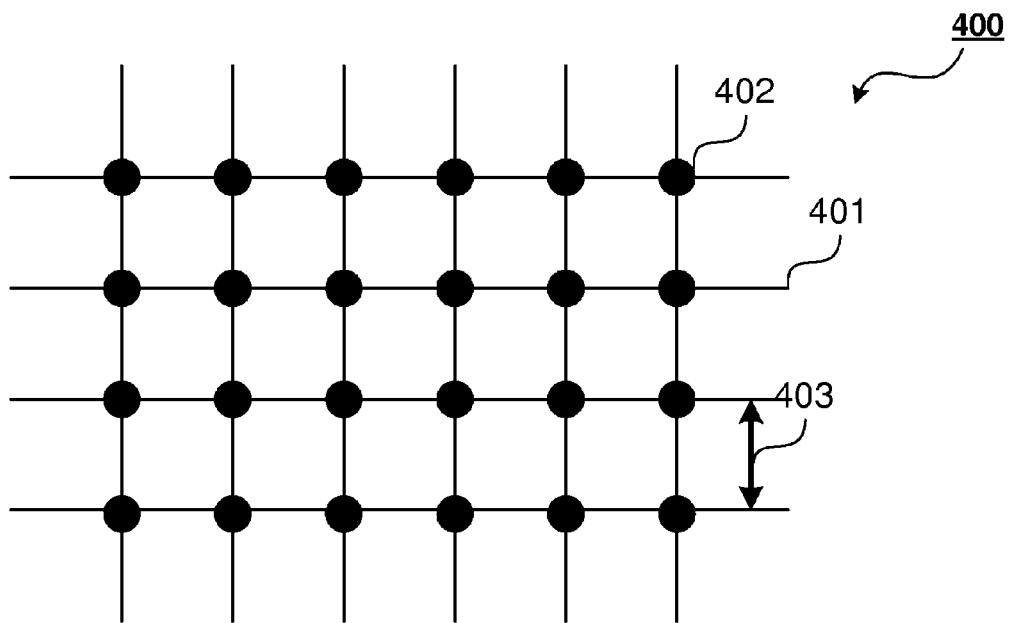
FIG. 4 illustrates a regular array of dots lying on a regular grid.

FIG. 4 shows the appearance of a regular grid 400 of dots 402, wherein the dots 402 lie at the intersections of a regular square grid 401. The square grid 401 has a pitch 403 herein referred to as "gp".

The difference between a regular array of dots 400 and an LVBC 300 is that the positions of the dots 302 in the LVBC 300 are slightly modulated away from the grid positions that the dots 302 would occupy if the dots 302 were part of a truly regular array 400. This slight modulation serves two purposes—the first is that it makes the LVBC dots 302 slightly less visible than the dots 402 of a regular grid 400. This is because the human visual system is very adept at noticing regular grids. The second purpose of the modulation is that a message in the form of digital data can be stored in the modulation of the dots 402.

Figure 5:
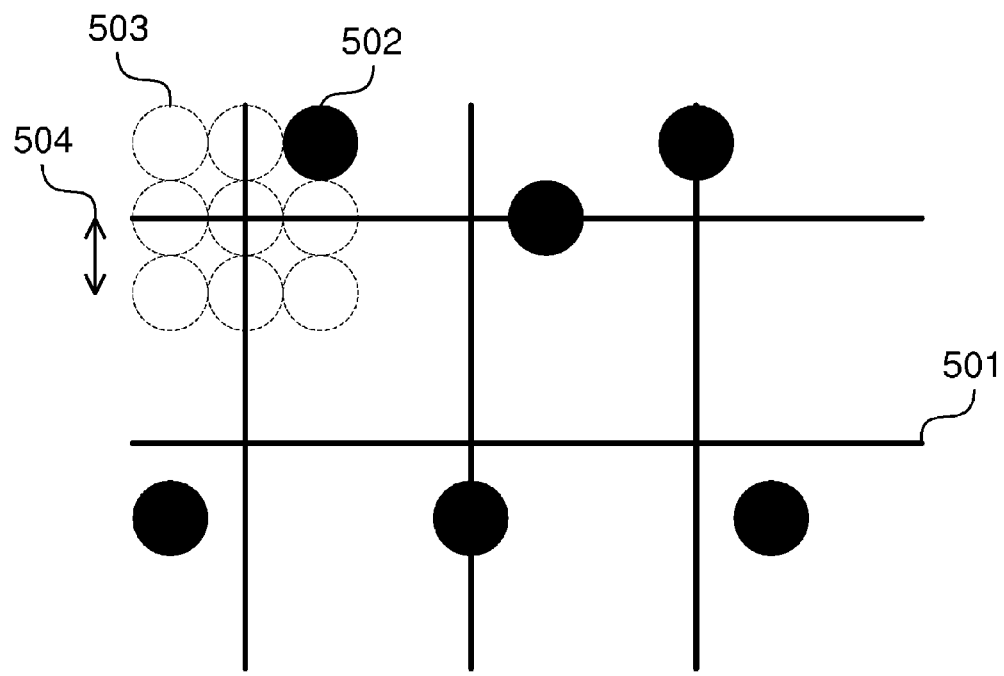
FIG. 5 illustrates modulation of the dots in greater detail.
Figure 6:
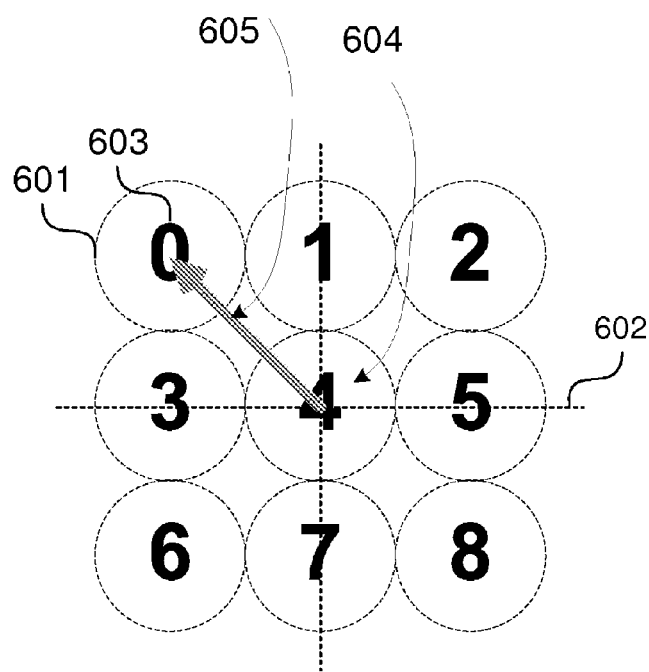
FIG. 6 illustrates modulation of the dots in even greater detail.
Figure 7:
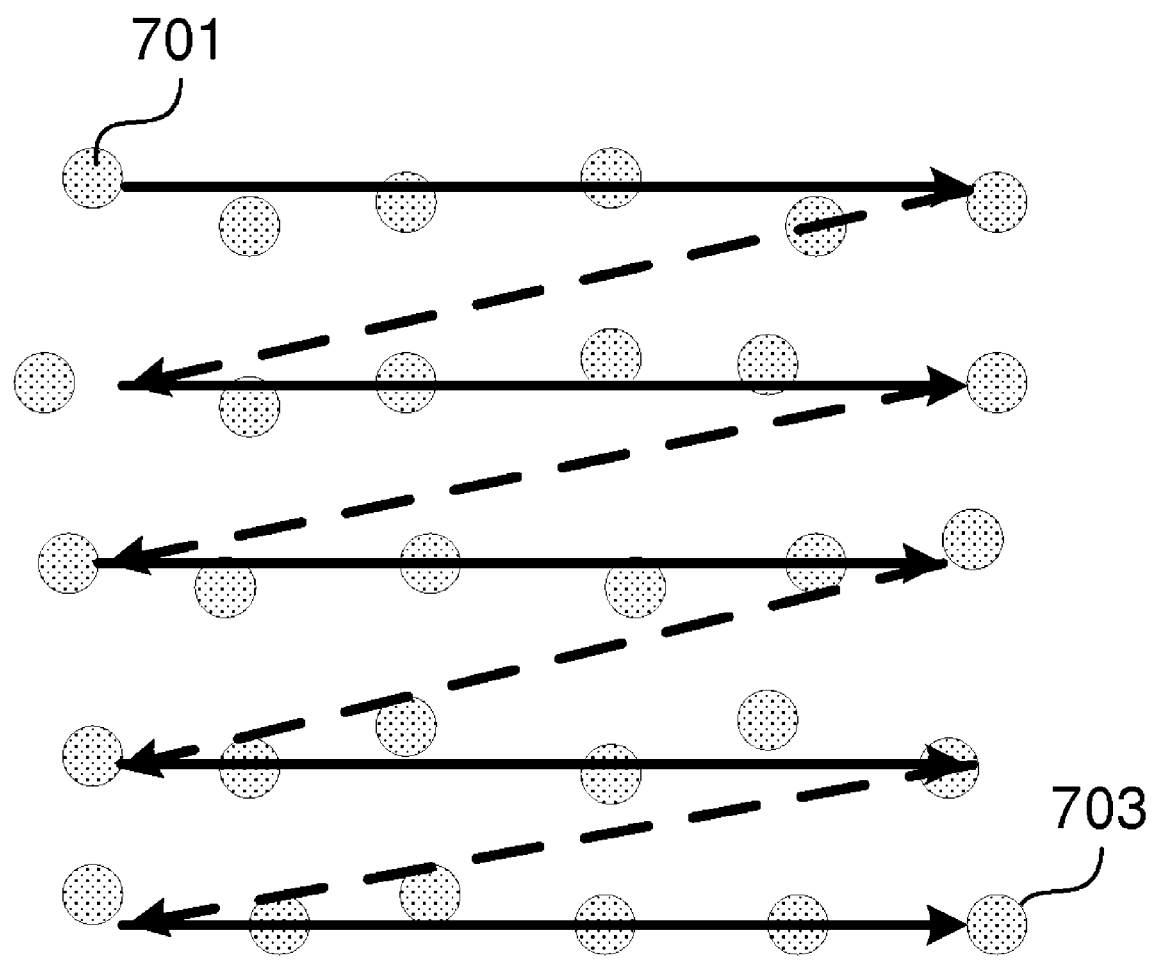
FIG. 7 illustrates ordering for the digits of an LVBC.
Figure 8:
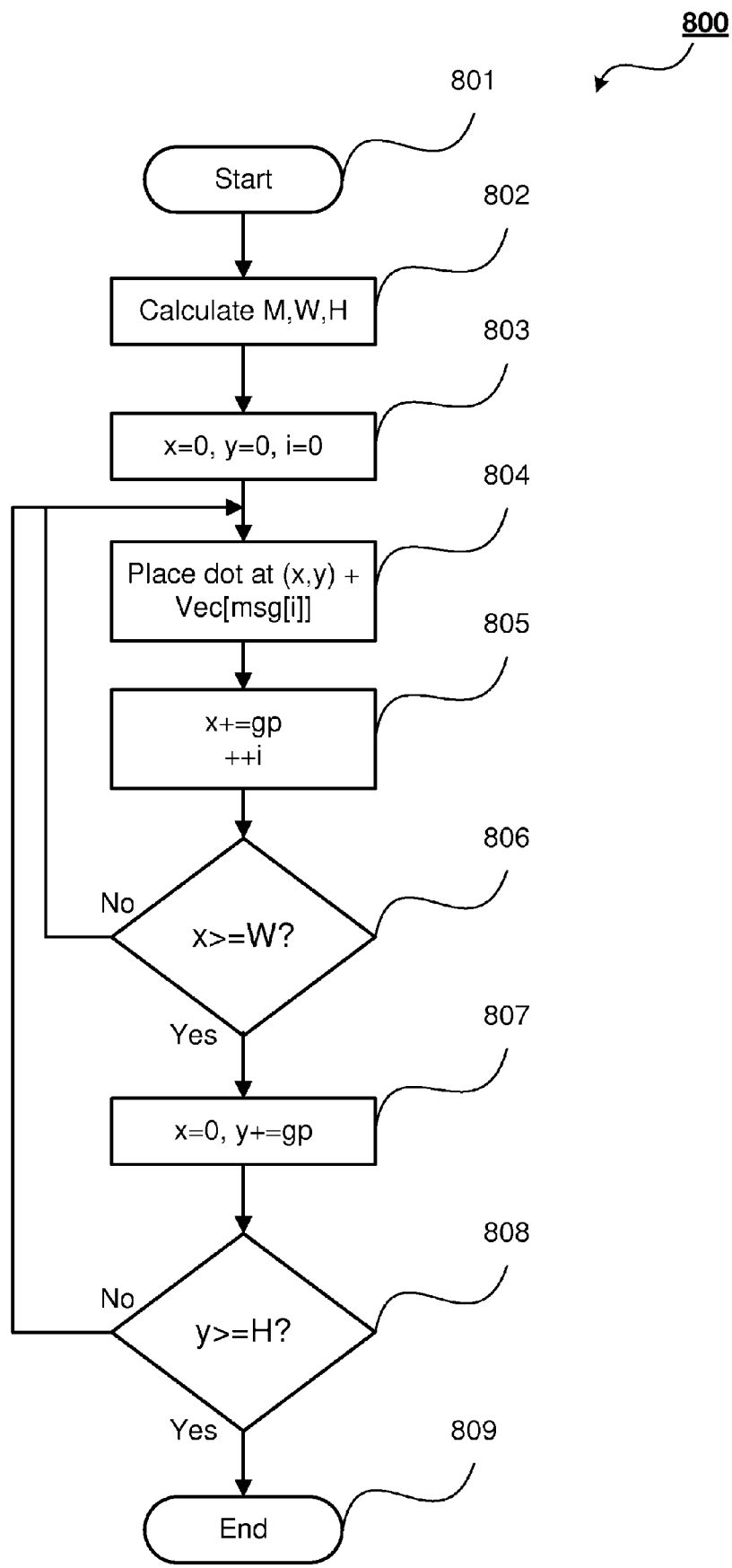
FIG. 8 is a flow diagram of a method for encoding LVBC data.

FIG. 5 illustrates modulation of the dots in greater detail. Dots 502 lie close to or upon the intersections of a regular grid 501, and each dot 502 is modulated to one of nine possible positions 503. The modulation, being the lateral and transverse location of each dot 502 relative to the corresponding intersection, represents the data of the pattern formed by the dots. The grid 501 is regular in the sense that the grid is definable and machine detectable and forms a set of reference locations about which modulation may take place for corresponding marks. As illustrated, the nine possible positions for each dot are arranged in a three by three array centered on the relevant or corresponding grid intersection. The central position of the three by three (3×3) array of positions 503 is located at the grid intersection, and corresponds to a modulation of zero distance horizontally and zero distance vertically. The remaining eight modulation positions are offset from the grid intersection horizontally, vertically, or both horizontally and vertically. The regular grid 501 may be considered a "carrier" signal for the modulated dots and, like a carrier wave in radio frequency communication, is not directly observable. The horizontal and vertical distance by which the modulation positions are offset is the modulation quantum 504, herein abbreviated as "mq". The locations of the nine modulation positions, relative to the corresponding grid intersection, can be written as a list of (x, y) vectors where x indicates the horizontal direction and y indicates the vertical direction, and using the convention that rightward offsets are positive with respect to x and downward offsets are positive with respect to y. The vectors are:

$(-mq,-mq)$, $(0,-mq)$, $(+mq,-mq)$, $(-mq,+0)$, $(0,+0)$, $(+mq,+0)$, $(-mq,+mq)$, $(0,+mq)$, and $(+mq,+mq)$ FIG. 6 illustrates dot modulation positions 503 in even greater detail. The positions 503 are centered on a grid intersection 604 of grid 602, and each modulation position, such as position 601, has an associated digital code value 603. The digital code value 603 for the position 601 is "0". The nine modulation positions (including position 601) allow each dot to encode one of nine possible digital code values (including the value 603 for the position 601). The modulation positions allow an LVBC to act as a digital data store, with each dot of the LVBC storing one base-nine digit of data. The preferred ordering of the digits of the digital data store is the ordering provided by using a rectangular array of dots, as shown in FIG. 7. This ordering starts at the topmost, leftmost dot 701 of FIG. 7 and proceeds successively left to right and then from top to bottom until the bottommost, rightmost dot 703 is reached. It will be readily appreciated by a person skilled in the art that other orderings may equally be utilised without departing from the spirit and scope of the present disclosure.
Encoder FIG. 8 is a flow diagram of a preferred method 800 of encoding an LVBC. In one implementation, the encoding is performed by a software application executable within the PC 101 or computer 1101 to generate the LVBC for printing onto the medium 107 by the printer 102 or 1115 respectively. Processing commences at step 801 which accepts as input a binary message that is to be encoded in the LVBC. This binary message is encoded with redundancy through the use of an Error Correction Code (ECC), such as Reed-Solomon or Low Density Parity Check (LDPC). The use of an ECC often allows an LVBC to be decoded in spite of limited transmission errors. In step 802, three variables M, W and H are calculated. M is the number of base-nine message symbols required to represent the message, W is the minimum width of the LVBC (expressed in LVBC dots) and H is the minimum height of the LVBC (also expressed in LVBC dots).

For a message of bit length BL, M is calculated as follows:

$$M = \left\lceil \left(\frac{\log 9}{\log 2}\right)^{-1} BL \right\rceil$$

The symbol "⌈ ⌉" represents the "ceil" operator, which returns the smallest integer greater than or equal to the value of its argument.

W and H are constrained by the inequality:

$WH \geq M$

Any integer solution to this inequality may be used, but the preferred solution is to create a square LVBC by requiring W to equal H, which means that W and H can be calculated as:

$W = H = \lceil \sqrt{M} \rceil$

In step 803, the three variables x, y and i are initialised to zero.

In step 804, one of the constituent dots of the LVBC is output. The dots can be output to any type of two dimensional substrate that can have dots placed on it, but in this particular example, the dot is output to a piece of paper 107 being printed on by printer 102. The dot is output at the position:

$(x,y) + Vec[msg[i]]$ where "msg" is the sequence of base-nine message symbols or data items which are to be stored in the LVBC. This sequence can readily be formed from the binary representation of the message accepted at step 801 by treating that message as one long binary number and then converting that number to base-nine representation using simple conversion techniques well known to those skilled in the art. "msg[i]" is the i'th digit of the message sequence, using the convention that msg[0] is the start of the sequence. msg[z] for z≧M is defined as zero.

"Vec" is an array of nine offset vectors, with the following values:

$Vec[0]=(-mq,-mq)$, $Vec[1]=(0,-mq)$, $Vec[2]=(+mq,-mq)$, $Vec[3]=(-mq,+0)$, $Vec[4]=(0,+0)$, $Vec[5]=(+mq,+0)$, $Vec[6]=(-mq,+mq)$, $Vec[7]=(0,+mq)$, $Vec[8]=(+mq,+mq)$, where mq is the aforementioned modulation quantum 504.

In step 805, the current horizontal position, x, is moved to the right by increasing x by the value gp 401. The message index i is also increased by one, so that the message index references a next digit of the message.

In step 806, the variable x is compared with the variable W. If x is greater than or equal to W then processing proceeds to step 807, otherwise processing returns to step 805.

In step 807, the current vertical position, y, is moved downward by increasing y by the value gp 401. The variable x is reset to zero. Processing then continues to step 808.

In step 808, the variable y is compared with the variable H. If y is greater than or equal to H, Yes, then processing proceeds to step 809, otherwise, No, processing returns to step 805.

Processing of this method concludes in step 809.

The end result of the method 800 is a pattern of dots forming an LVBC, each dot having a digitally phase modulated (x,y) coordinate relative to a corresponding intersection of a grid. The grid has an arbitrary origin O (0,0). By setting the origin O to a specific coordinate (X,Y) on the print medium 107, the PC 101 can instruct printing of the data on the medium 107, thereby resulting in the LVBC being reproduced and commencing at location (X,Y).

Decoder

FIG. 9 is a flow diagram of a method 900 for decoding a low visibility barcode (LVBC) in an image, wherein the LBVC is encoded as described above. The method 900 is in one implementation performed as a software application executable within the PC 106 having input the LVBC read via the scanner 104. The basic premise of the decoding method is to determine the correct orientation of the grid from which the encoded LVBC was formed. Knowing the regularity of the grid itself means that once the grid is identified, demodulation of the dot locations may directly follow. The method 900 commences in step 901, which accepts as input a scanned image of a page incorporating an LVBC, for example printed or otherwise machine readable from the page. In one implementation, the scan takes the form of an 8 bit greyscale JPEG image scanned at 600 dpi. In step 903, a plurality of dots that form the LVBC are detected, and then the step stores/records positions/coordinates (on the page) associated with the detected dots in a list of coordinate data. Step 903 may be performed using connected component analysis of the scanned image. In such analysis, individual pixels of the image are examined to connect and group those pixels that are spatially adjacent. By analysing the group in terms of its shape, the presence of a mark (i.e., a circular dot or generally uniform blob of pixels of the appropriate expected size) can be detected. The centroid of the mark may then be determined to identify a coordinate location corresponding to the detected mark (dot).

In step 905, the list of dot coordinates obtained in step 903 is analysed to detect/identify a regular grid which forms the carrier signal of the LVBC. This process returns the pitch (gp 401), rotation angle and modulation quantum $M_q$ (504) of the regular grid, and also converts the supplied list of coordinate data into a rectangular array of coordinate data, ordered as shown in FIG. 7. Upon being presented with a modulated grid representing encoded data, it is useful to determine the orientation and spacing for the modulated grid. In step 905, the grid spacing may be determined on the basis that in a modulated grid, the average spacing between the dots will equal the grid spacing. The grid orientation may be determined on the basis that the average direction between adjacent dots of the modulation grid is aligned with lines of a regular square grid (or 'carrier grid').

The modulation quantum refers to the horizontal and vertical distance by which the remaining modulation positions are offset from the corresponding carrier grid intersection point (604 in FIG. 6). The dots of a modulated grid will lie close to carrier grid intersection points. In one implementation, each dot of the modulated grid is modulated to one of nine possible positions arranged in a three by three array centered on a corresponding carrier grid intersection point. A central position of such a three by three array is located at the corresponding carrier grid intersection point, and corresponds to a modulation of zero distance horizontally and zero distance vertically. The remaining eight modulation positions are offset from the corresponding carrier grid intersection point.

In step 907, the information stored in the position of each dot is demodulated. Returning to FIG. 6, demodulation is achieved by measuring a vector that runs from the nearest carrier grid intersection point 604 of the regular grid 602 to the nearest, or most proximate LVBC dot. The measured vector is compared with the vectors from the intersection point 604 to the nine modulation positions showed in FIG. 6. In FIG. 6, the vector 605 extends from the point 604 to the modulation position 601. Similar vectors exist for each of the other modulation positions. The modulation position vector which correlates to or most closely matches the measured vector of the LVBC dot is chosen as the correct position, and the corresponding digital data value, such as the value 603, is chosen as the correct data value for the LVBC dot. The closeness of match may be determined in a number of ways. A first way is to use a Euclidean comparison of vectors extending from the grid intersection position. For example, using the vectors $V_1(x_1, y_1)$ and $V_2(x_2,y_2)$, the minimum Euclidean distance of all possible nine vectors, in the described arrangement may be calculated using:

$$D_e = sqrt((x^1-x_2)^2+(y_1-y_2)^2)$$

Alternatively, angles relative to the grid intersection may be used if one assumes that where the angle is indeterminate due to the length of the vector being close to zero, the modulation degenerates to the intersection position. All of the dots returned by step 905 are thus processed, with processing carried out in the order shown in FIG. 7.

By this stage, the LVBC has been decoded to the point where the LVBC is in the form of a substantially rectangular array of base-nine data symbols. This array goes part of the way towards providing the correct ordering of the data symbols, but it still remains to identify which data symbol is the start of the message. This is because the rotation of the LVBC has not yet been fully resolved. Step 905 only detects rotation modulo 90 degrees (i.e., any rotation by 90°, 180° or 270° has not yet been detected). This issue is addressed in step 909, which is explained in detail below with reference to FIG. 10.

According to one embodiment of the present disclosure, there is provided a method of determining a correct orientation of an information mark that for ECC encoded digital data used for the protection of the digital data. The method includes the steps of: attempting decoding of the ECC encoded data for one possible orientation of the information mark and, if ECC decoding fails, then adopting a different possible orientation of the information mark and decoding of the ECC encoded data is again attempted.

FIG. 10 is a flow diagram 1000 of a method of step 909 of FIG. 9 for finding the start of message data of the LVBC. Processing commences in step 1005, and in step 1010 the demodulated data produced in step 907 is checked for correctness. This checking for correctness is achieved by attempting ECC decoding of the ECC encoded data in the demodulated data. If the LVBC is incorrectly oriented (such as by rotation by 90°, 180° or 270°), then ECC decoding will fail because rotation scrambles the location of the message data digits and also scrambles the modulation values. Failed ECC decoding indicates that the demodulated data is incorrectly oriented. In the case that ECC decoding fails at step 1010, No, processing continues to step 1015. Alternatively, if ECC decoding succeeds at step 1010, Yes, then processing passes to step 1025, with the start of the message correctly detected. Processing then continues to step 911 of FIG. 9.

The checking of step 1010 could be for a perfect ECC decoding result, but in one embodiment the checking is for a near perfect ECC decoding result. This approach is used because LDPC is used as the ECC in one embodiment, and LDPC works by iterative decoding where each iteration tends to have fewer errors than the previous iteration. Thorough LDPC decoding could be performed, but the processing time would be excessive in the case that the LVBC is misaligned, because the LDPC decoding operation would fail to converge on a correct result, even after a large number of iterations.

The criterion used in step 1010 to judge whether the LDPC decoding is near perfect is now described. LDPC decoding is an imperfect process, in that decoding is only possible when the number of errors is limited. When a message has a number of errors that exceed this limit, LDPC decoding becomes impractical. This limit can be accurately estimated experimentally by:

Taking a large number of messages;
LDPC encoding each message;
For each message, corrupting a percentage, pe, of the encoded values; and
Attempting thorough LDPC decoding of each message.

The largest corruption percentage pe that can consistently and reliably be corrected by thorough LDPC decoding is recorded as lpe, the largest percentage of errors that can reasonably be expected to be corrected.

A second experiment is then conducted by:
Taking a large number of messages;
LDPC encoding each message;
For each message, corrupting lpe percent of the encoded values;
For each message, attempting a single iteration of LDPC decoding and recording the number of ECC checksums that failed, ncf.

Finally, the highest value of ncf recorded in this experiment is used as a threshold for determining whether LDPC decoding is near enough to perfect. If a single iteration of LDPC decoding results in a number of failed LDPC checksums that is less than or equal to ncf, then the LDPC decoding is deemed to be near perfect ("ECC good" in step 1010).

In step 1015, a test is made as to whether all possible orientations of the LVBC have been checked for correctness (i.e., is it the final rotation?). As LVBC uses a square grid, this is simply a test that the number of checked orientations is less than four (for alternate types of barcode based on triangular or hexagonal grids the test would be that the number of checked orientations was less than three or six, respectively). If all four orientations have been unsuccessfully checked, Yes, then processing concludes in failure at step 1030, as a correct orientation of the data could not be found. Otherwise, processing continues with step 1020.

In step 1020, the grid is rotated by ninety degrees in a clockwise direction. This is In step 1020, the grid is rotated by ninety degrees in a clockwise direction. This is achieved by moving each dot by rotation through 90° centered upon the center of the grid, and by re-interpreting the modulation of each dot to compensate for the rotation. The re-interpretation is achieved by replacing each modulation value with the corresponding rotated modulation value found in the following look up table shown in Table 1 below:

TABLE 1

| Modulation | Rotated modulation |
|---|---|
| 0 | 2 |
| 1 | 5 |
| 2 | 8 |
| 3 | 1 |
| 4 | 4 |
| 5 | 7 |
| 6 | 0 |
| 7 | 3 |
| 8 | 6 |

Step 1020 results in a re-interpretation of the data for a different orientation of the pattern of marks. Whilst such is described relative to a rotation of the grid, alternatively the pattern of marks may be rotated relative to the grid and new position vectors determined for each mark, from which the corresponding (rotated) data values are determined.

After the conclusion of step 1020, processing returns to step 1010. The process of checking for correct orientation then occurs for the rotated data. This procedure continues until a correct orientation is found and the process exits successfully at step 1025 or fails at step 1030. Failure ends the method 900 whereas success permits the method 900 to proceed to step 911 of FIG. 9.

An alternative embodiment performs ECC decoding for each rotation and records the number of ECC checksums that failed, ncf. The orientation with the smallest number for ncf is returned as the correct orientation.

Returning to FIG. 9, step 911 accepts as input the rectangular grid of detected base-nine data values that has been processed by step 909 until the message start is located in the topmost, leftmost position of the correctly oriented grid. Step 911 then assembles a decoded message by starting at the topmost, leftmost data value and proceeding from left to right and from top to bottom, outputting base-nine data values as it goes. The order of processing the base-nine data values is the order illustrated by FIG. 7, which has already been described.

The decoding process concludes in step 913 with the ECC encoded demodulated data extracted from the LVBC. After this, the ECC encoded demodulated data can be corrected by ECC decoding. In one embodiment, this is achieved by thorough (multiple iteration) LDPC decoding.

The arrangements described provide for the formation and reading of a data pattern in a document, the pattern having a plurality of marks formed in the document, each mark being machine readable and having a location digitally phase modulated relative to a reference position, such as a corresponding intersection location of a virtual grid forming a non-visible carrier of the pattern, the modulation representing the data in the pattern.

The marks are preferably dots formed by printing and collectively form a code permitting identification of the document. The size of the marks can vary depending upon the particular application and the level of visibility to be tolerated. The size can be as small as one pixel at the print resolution for the document thereby providing for low visibility to the human eye whilst permitting scanning for electronic machine reading. The marks and the identification data they carry represents a functional equivalent to well-known barcodes and may be termed a "barcode" even though no "bars" are actually formed. When combined with the low visibility aspect, the pattern may be considered a low visibility barcode (LVBC), even though the marks have no bars and, in some implementations, may be quite visible to the human eye.

Whilst on encoding, the array may be of a useful size sufficient to convey the desired amount of data, decoding requires a practical minimum array size to ensure that the array is accurately detected, which is essential for accurate decoding. One practical minimum grid/array size is about 8×8 (i.e., giving 64 marks) with reliably practical sizes being 10×10 or 12×12. An 8×8 grid size, in the present base 9 arrangement, affords about 202 (=64($\log_2 9$)) bits of data. It will be appreciated by a person skilled in the relevant art that other grid/array sizes may equally be practiced without departing from the spirit and scope of the present disclosure.

It will be apparent from the above that there is only one modulated dot for each intersection of the grid, thereby being unique for that intersection. If there were two or more dots related to an intersection, then ambiguity would prevail and decoding would produce a nonsensical result. Accordingly, for any practical implementation, the possible modulated dot locations for any one intersection should not overlap with the dot's possible modulated locations for another (e.g., adjacent) intersection.

Some other approaches provided computer readable marks that are formed by dots positioned at the intersection of a regular (square) grid. In those instances, a dot may be produced at an intersection to represent a logical "1" with no dot being produced representing a logical "0". This can result in ambiguity where no dot is produced in that such could be interpreted as the absence of a computer readable mark, rather than a logical "0". In contrast, with the presently disclosed arrangements, all data values are represented by a mark, and it is the position of the mark, relative to the corresponding intersection of the virtual grid, that determines the data value(s). Thus, the likelihood of ambiguity is reduced. The mark need not be a dot, which, in its simplest rendering, may be a single droplet of ink on paper, which will reveal a tiny substantially circular mark. The mark may, in some implementations, be a group of dots, forming any desired and detectable shape, such as a square or triangle, for example. A large practical dot may be equivalent to a full stop, as such appears at the end of this sentence. Such, depending on font size, may occupy many displayable or printable pixels.

The arrangements described result in the formation of electronic page data which, when output to the printers 102, 1115, result in hard-copy reproduction of the page data, which may have information content and one or more LVBCs as described. The electronic data forms an electronic document that may be stored for subsequent reproduction, either electronically via the video display 1114, or via the printer 102, 1115. Similarly, the scanning of a document incorporating an LVBC as described produces an electronic document whose page data will include one or more LVB Cs. Irrespective of their mode of reproduction and/or storage, such electronic documents may be communicated between computers (via the network 1120 for example) for printing or decoding.

LVBC Background

The present disclosure also relates to decoding dot patterns in an image. A dot pattern is a modulated grid of dots, which encodes at least a data message. It is notable that, in at least one implementation, a dot pattern need not have any alignment or synchronizing marks. However, the present implementation is nevertheless able to detect dot patterns that do contain alignment or synchronizing marks.

One implementation of an embodiment in accordance with the present disclosure is practiced in software embedded in or linked to a photocopier. When an image containing dot patterns is attempted to be copied using a photocopier, the image is analyzed in order to detect dot patterns. The decoded messages determine whether or not the image is authorized to be reproduced. For example, if out of the four messages decoded from an input image, three messages allow copying, while one message prohibits copying, then the input image is not copied. Furthermore, an alternate embodiment may only reproduce the dot pattern regions that allow copying, omitting the dot pattern regions that prohibit copying.

In an alternative implementation, it is possible to visually identify to an operator the dot pattern regions that have been identified by the present embodiment and their associated decoded messages.

Figure 38:
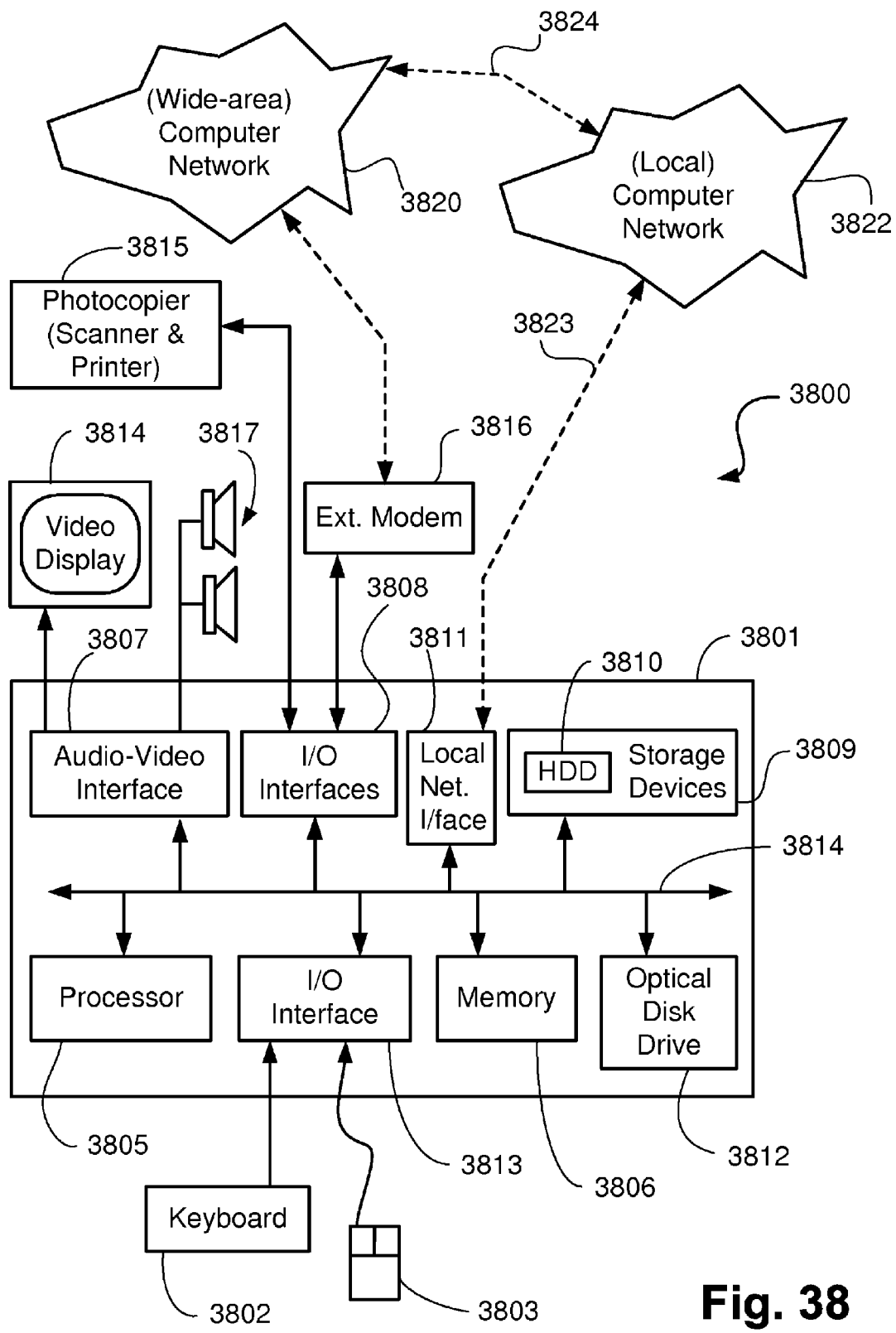
FIG. 38 is a schematic block diagram representation of a computer system in which the arrangements described can be practiced.

The methods described herein may be implemented using a computer system 3800 coupled to a photocopier 3815, such that as shown in FIG. 38, wherein the processes of FIGS. 1-10, 12-37 may be implemented as software, such as one or more application programs executable within the computer system 3800. The computer system 3800 can thus detect an attempted copying operation and thus control a scanner and printer collectively forming the photocopier 3815 in the copying process. In one implementation, the computer system 3800 implements a method for identifying a constellation of alignment marks within an arrangement of computer readable marks in an image. The photocopier 3815 can be utilised to scan the image containing computer readable marks. In particular, the steps of the methods of constellation identification, barcode detection and copy protection are effected by instructions in the software that are carried out within the computer system 3800. The instructions may be formed as one or more code modules, each for performing one or more particular tasks. The software may also be divided into two separate parts, in which a first part and the corresponding code modules performs the identification and detection methods and a second part and the corresponding code modules manage a user interface between the first part and the user. The software may be stored in a computer readable medium, including the storage devices described below, for example. The software is loaded into the computer system 3800 from the computer readable medium, and then executed by the computer system 3800. A computer readable medium having such software or computer program recorded on it is a computer program product. The use of the computer program product in the computer system 3800 preferably effects an advantageous apparatus for barcode detection and constellation detection.

As seen in FIG. 38, a computer system 3800 is formed by a computer module 3801, input devices such as a keyboard 3802 and a mouse pointer device 3803, and output devices including a display device 3814 and loudspeakers 3817, and also a connection to the photocopier 3815. An external Modulator-Demodulator (Modem) transceiver device 3816 may be used by the computer module 3801 for communicating to and from a communications network 3820 via a connection 3821. The network 3820 may be a wide-area network (WAN), such as the Internet or a private WAN. Where the connection 3821 is a telephone line, the modem 3816 may be a traditional "dial-up" modem. Alternatively, where the connection 3821 is a high capacity (e.g., cable) connection, the modem 3816 may be a broadband modem. A wireless modem may also be used for wireless connection to the network 3820. The networks 3820 and 3822 may afford access to other photocopiers that may be desired to be controlled in a similar fashion.

The computer module 3801 typically includes at least one processor unit 3805, and a memory unit 3806 for example formed from semiconductor random access memory (RAM) and read only memory (ROM). The module 3801 also includes an number of input/output (I/O) interfaces including an audio-video interface 3807 that couples to the video display 3814 and loudspeakers 3817, an I/O interface 3813 for the keyboard 3802 and mouse 3803 and optionally a joystick (not illustrated), and an interface 3808 for the external modem 3816 and photocopier 3815. In some implementations, the modem 3816 may be incorporated within the computer module 3801, for example within the interface 3808. The computer module 3801 also has a local network interface 3811 which, via a connection 3823, permits coupling of the computer system 3800 to a local computer network 3822, known as a Local Area Network (LAN). As also illustrated, the local network 3822 may also couple to the wide network 3820 via a connection 3824, which would typically include a so-called "firewall" device or similar functionality. The interface 3811 may be formed by an Ethernet™ circuit card, a wireless Bluetooth™ or an IEEE 802.11 wireless arrangement.

The interfaces 3808 and 3813 may afford both serial and parallel connectivity, the former typically being implemented according to the Universal Serial Bus (USB) standards and having corresponding USB connectors (not illustrated). Storage devices 3809 are provided and typically include a hard disk drive (HDD) 3810. Other devices such as a floppy disk drive and a magnetic tape drive (not illustrated) may also be used. An optical disk drive 3812 is typically provided to act as a non-volatile source of data. Portable memory devices, such optical disks (e.g., CD-ROM, DVD), USB-RAM, and floppy disks for example may then be used as appropriate sources of data to the system 3800. In one implementation, a constellation identified in accordance with an embodiment of the present disclosure is stored in one or more of the storage devices 3809. The stored constellation can then be used for decoding data carrying marks at a later time.

The components 3805 to 3813 of the computer module 3801 typically communicate via an interconnected bus 3804 and in a manner which results in a conventional mode of operation of the computer system 3800 known to those in the relevant art. Examples of computers on which the described arrangements can be practiced include IBM-PCs and compatibles, Sun Sparcstations, Apple Mac™, or alike computer systems evolved therefrom.

Typically, the application programs discussed above are resident on the hard disk drive 3810 and read and controlled in execution by the processor 3805. Intermediate storage of such programs and any data fetched from the networks 3820 and 3822 may be accomplished using the semiconductor memory 3806, possibly in concert with the hard disk drive 3810. In some instances, the application programs may be supplied to the user encoded on one or more CD-ROM and read via the corresponding drive 3812, or alternatively may be read by the user from the networks 3820 or 3822. Still further, the software can also be loaded into the computer system 3800 from other computer readable media. Computer readable media refers to any storage medium that participates in providing instructions and/or data to the computer system 3800 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 3801. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 3814. Through manipulation of the keyboard 3802 and the mouse 3803, a user of the computer system 3800 and the application may manipulate the interface to provide controlling commands and/or input to the applications associated with the GUI(s).

The method of mark detection may alternatively be implemented in dedicated hardware such as one or more integrated circuits performing the functions or sub functions of image processing. Such dedicated hardware may include graphic processors, digital signal processors, or one or more microprocessors and associated memories. Further, whilst described with reference to the computer system 3800 coupled to the photocopier 3815, much of the describe functionality of the computer system 3800 may be incorporated into the photocopier 3815, thus permitting specific local operation.

Basic Structure

Figure 28:
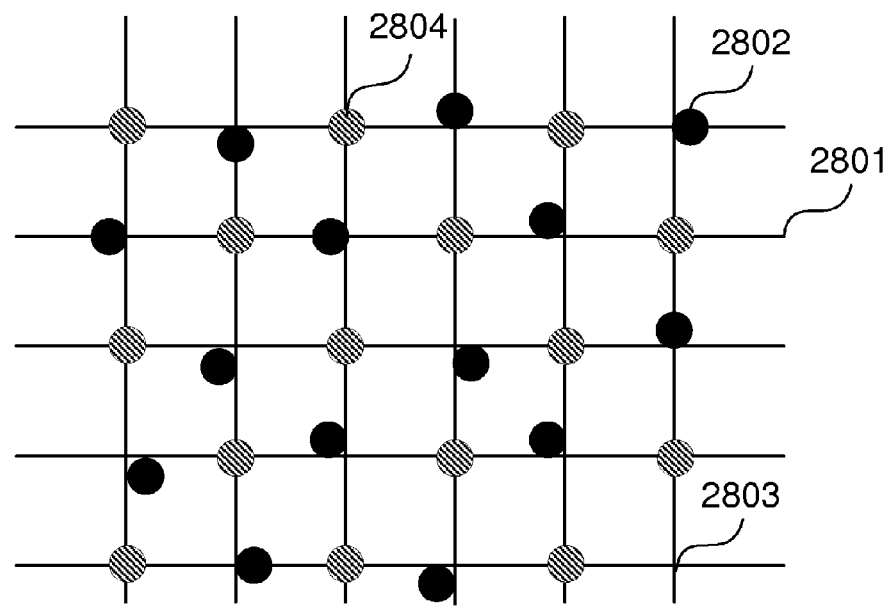
FIG. 28 illustrates a modulated grid of dots used for encoding data in a barcode in accordance with an embodiment of the present disclosure.

Data is stored in a barcode using a modulated grid. FIG. 28 shows an enlarged view of the appearance of a modulated grid. A modulated grid is formed of a large number of marks in the form of dots 2802 and 2804 that lie close to the intersection points 2803 of a square grid 2801. Note that it is only the dots 2802 and 2804 that form the visible modulated grid, and the grid 2803 is illustrated purely for explanation of the location of the dots 2802 and 2804.

The modulated grid consists of two types of dots. The dot 2802 is an example of a 'data' dot—this dot is modulated around an intersection point 2803. The dot 2804 is an example of an 'alignment' dot—this dot lies exactly on an intersection point 2803. Data carrying dots and alignment dots are shown with different shading in FIG. 28, but data carrying dots and alignment dots are actually identical except for their respective modulation; the shading is for illustrative purposes. In the illustrated example of FIG. 28, the barcode consists of 50% data carrying dots and 50% alignment dots; of course, other arrangements are possible with minimal change and without departing from the spirit and scope of the present disclosure.

Figure 29:
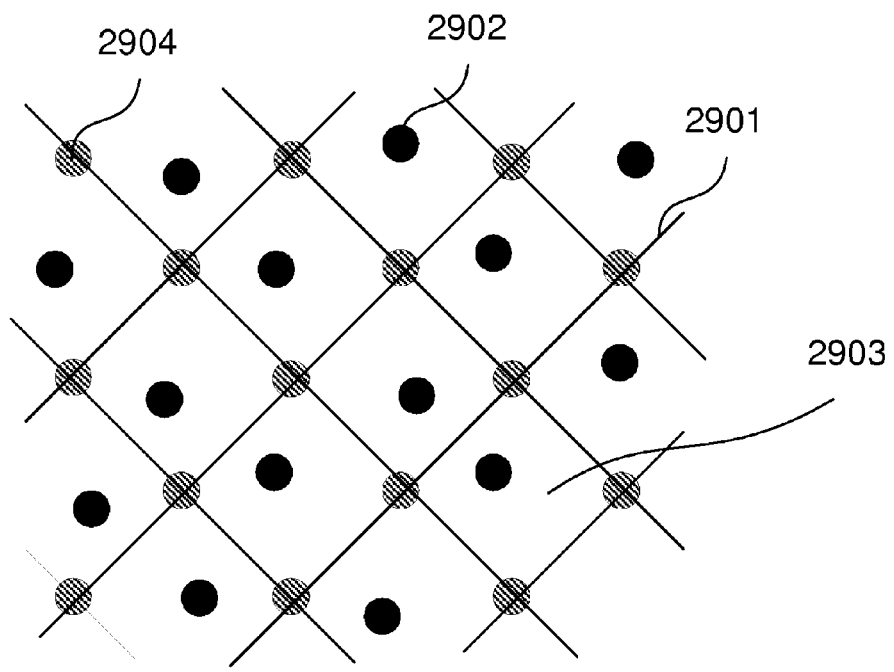
FIG. 29 illustrates a conceptual view of a modulated grid of dots for decoding purposes.

FIG. 29 shows a grid 2901 discovered from barcode decoding. A data carrying dot 2902 is shown within a square of the grid 2901 and an alignment dot 2904 is shown on an intersection of the grid 2901. The alignment dots are used to build the grid 2901, and appear on each grid intersection point. As the alignment dots are located at every second dot, the discovered grid is 45 degrees offset from the original square grid with a grid spacing a factor of $\sqrt{2}$ larger. This discovered grid 2901 divides the page into many square grid cells shown by 2903, where each grid cell contains exactly one data carrying dot. Grid cells are the basic unit used for barcode data storage and decoding.

Figure 30:
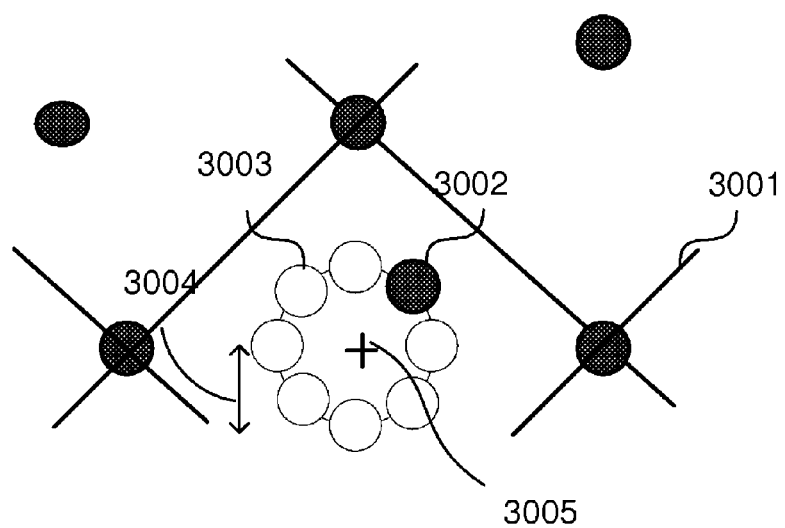
FIG. 30 illustrates how data is encoded into the modulation of a single dot.

FIG. 30 shows how information is stored in a data carrying dot in a grid cell. Dots 3002 lie close to the grid cell centers 3005 of the grid cells in grid 3001, and each dot is modulated to one of eight possible positions 3003. The eight possible positions for each dot are arranged in a circle centered on the relevant grid intersection. The eight modulation positions are offset from the grid center horizontally, vertically or diagonally. The horizontal and vertical distance by which the modulation positions are offset is the modulation quantum 3004, herein abbreviated as "$M_q$". $M_q$ is chosen to be a fixed percentage of the side length of the grid cell—a good choice for $M_q$ is 40% of the original square grid spacing, but other percentages may equally be practiced.

Figure 31:
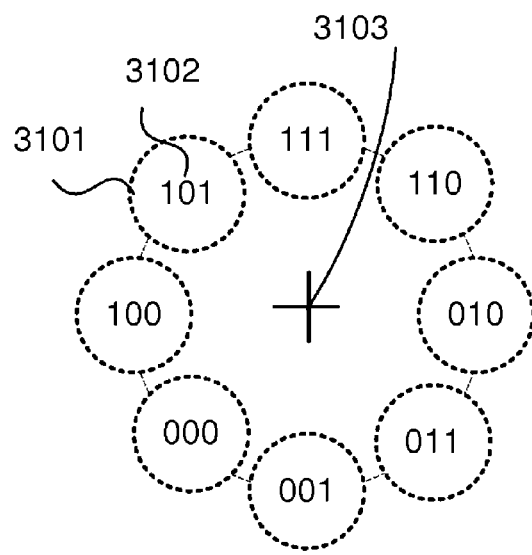
FIG. 31 illustrates an encoding scheme used to encode data into modulation of a single dot.

FIG. 31 shows the dot modulation positions 3003 in even greater detail. The dot modulation positions 3003 are centred on a grid cell centre 3103, and each modulation position, such as 3101, has a digital code value, such as 3102, associated with it. The eight modulation positions (including 3101) allow each dot to encode one of eight possible digital code values (including 3102 for 3101). This allows a modulated grid to act as a digital data store, with each dot of the modulated grid storing one base-eight digit of data. Ideally, each dot encodes a code value such that the dots are arranged in a Gray code in the circle. This facilitates error correction during decoding. FIG. 31 shows the digital code value of each dot in binary. Thus, starting clockwise from 3102, the dots encode the values: 5, 7, 6, 2, 3, 1, 0 and 4. Other modulation techniques could be used without departing from the scope of the invention. For example, sixteen modulation positions can be used to encode one of sixteen possible digital code values.

Figure 32:
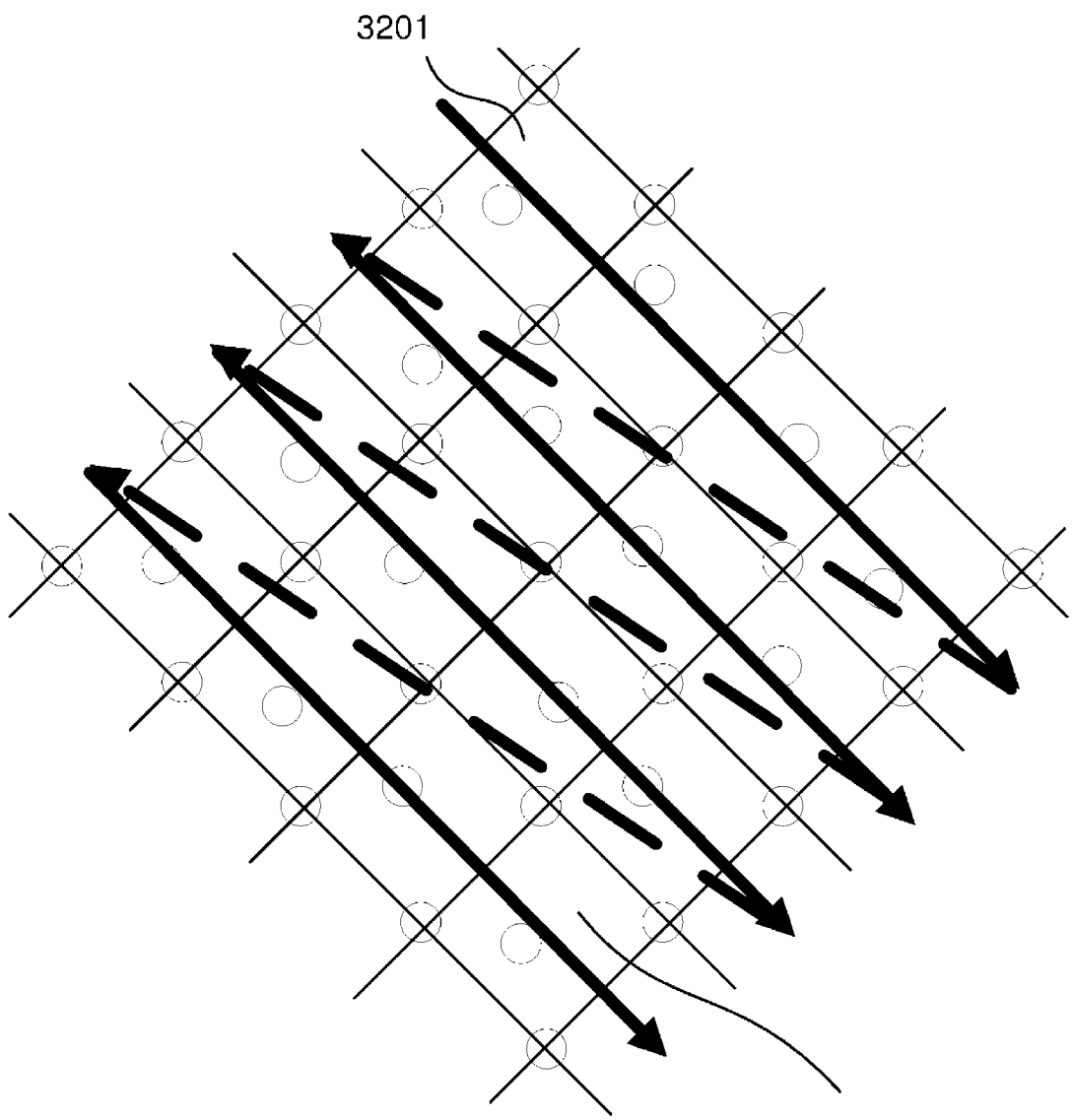
FIG. 32 illustrates a decoding order of data carrying dots.

The preferred ordering of the digits of the digital data store is the ordering provided by using a rectangular array of dots, as shown in FIG. 32. This ordering starts at the topmost, leftmost grid cell 3201 and proceeds left to right and then from top to bottom until the bottommost, rightmost grid cell 3202 is reached. It is of course possible to use other orderings.

Figure 33:
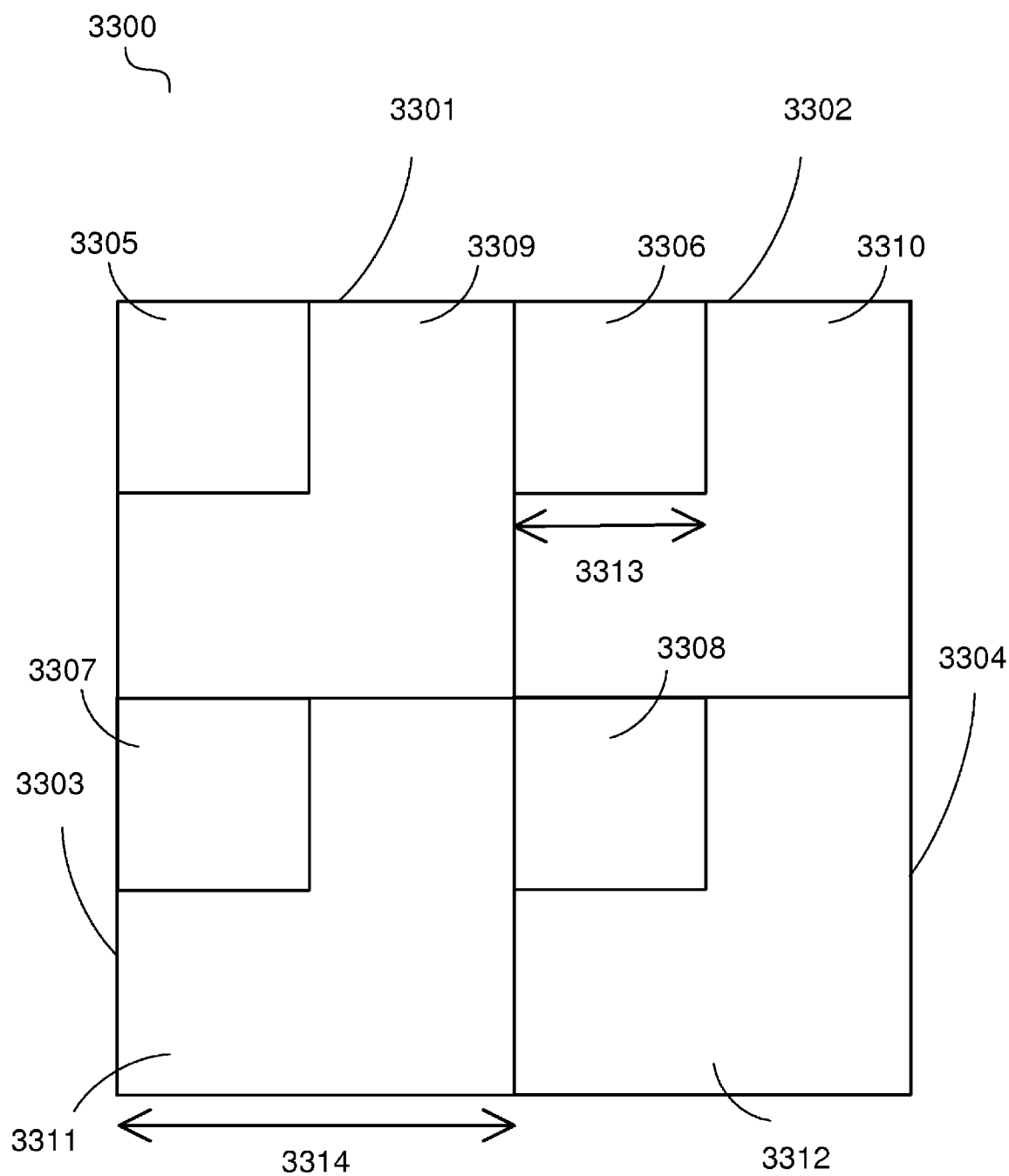
FIG. 33 illustrates a tiling scheme used for a barcode in accordance with one embodiment of the present disclosure.

In one implementation, two channels of data are stored simultaneously in one barcode. The data is repeatedly tiled over the entire grid. FIG. 33 shows a single unique tile 3300 and the tiling arrangement used. The barcode is then repeatedly tiled over the entire grid for redundancy. Logically, each barcode tile represents the data from two separate data channels: a high data density (herein referred to as "HDD") channel and a low data density (herein referred to as "LDD") channel. The HDD channel has low robustness, while the LDD channel has high robustness. Spatially, the barcode tile 3300 is composed of four sub-tiles 3301, 3302, 3303 and 3304 herein referred to as HDD channel tiles. HDD channel tiles are square grids with dimensions of 3314 (herein referred to as 'HDD tile size') in units of grid cells or data carrying dots. Each HDD channel tile contains one smaller embedded tile herein referred to as an LDD channel tile. The LDD channel tiles in the barcode tile are 3305, 3306, 3307 and 3308. This means that the barcode tile 3300 contains four copies of the LDD channel tile.

Each LDD channel tile is a square grid with dimensions of 3313 (herein referred to as 'LDD tile size') in units of grid cells or data carrying dots. Additionally, the HDD channel occupies the full area of the four HDD channel tiles excluding the LDD channel tiles, which means the barcode tile contains only a single copy of the HDD channel. For example, areas 3309, 3310, 3311 and 3312 collectively make up the HDD channel. The number of HDD channel tiles used to store the HDD channel can be expanded as required. Currently, barcode tile 3300 uses a 2×2 arrangement of HDD channel tiles, but it is possible to expand this to the next larger arrangement, a 3×3 arrangement of HDD channel tiles. Notice that this tiling scheme maintains a constant density of LDD channel tiles independent of the HDD channel arrangement used, thus providing a highly redundant and robust LDD channel. An error-correcting code (ECC) can be applied to the data in either or both LDD and HDD channels. One embodiment uses a low density parity check (LDPC) code which is a high-performance ECC well known in the art.

Decoding Process

Figure 34:
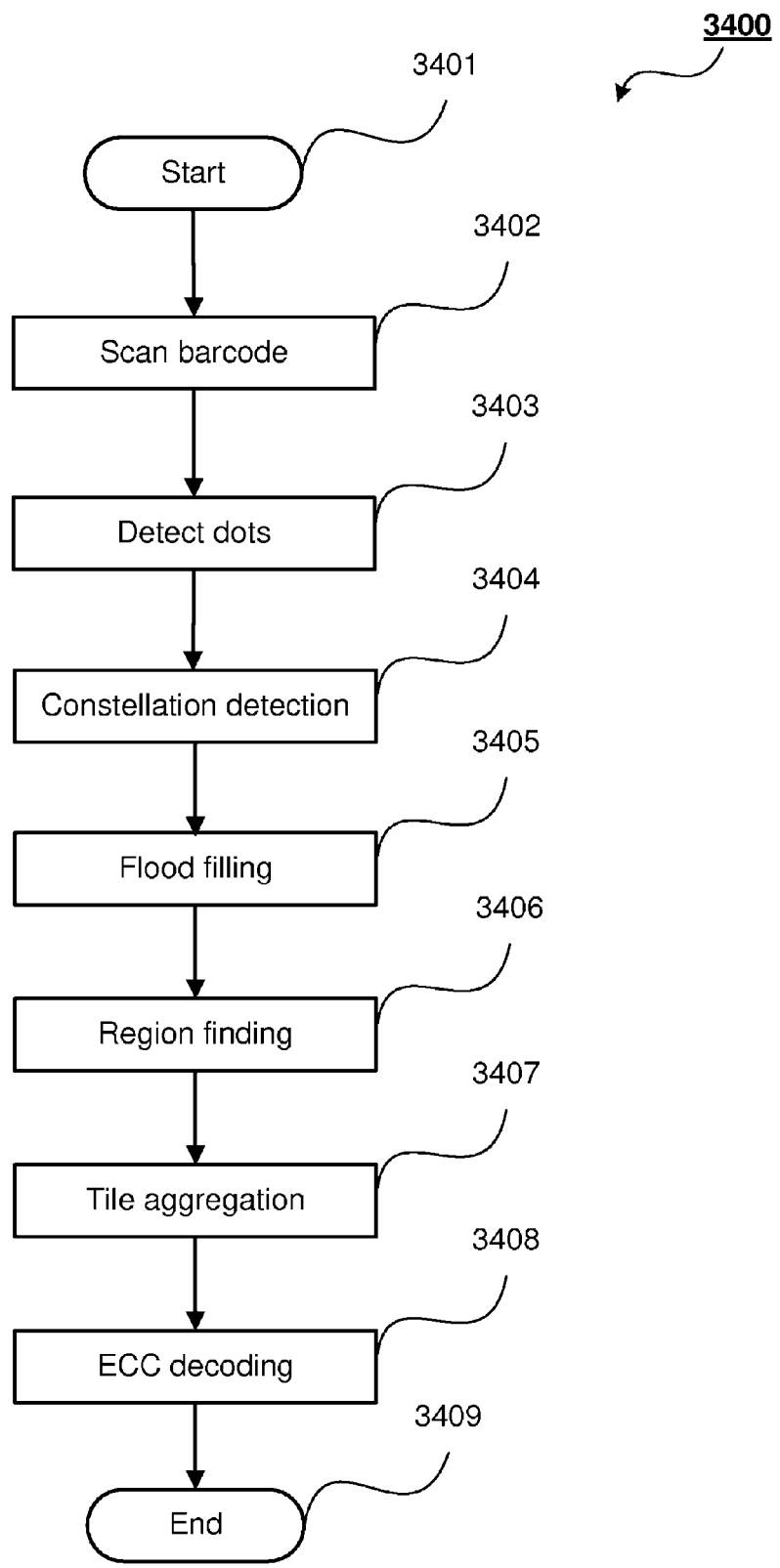
FIG. 34 is a flow diagram of intermediate stages of a method for barcode decoding.
Figure 35:
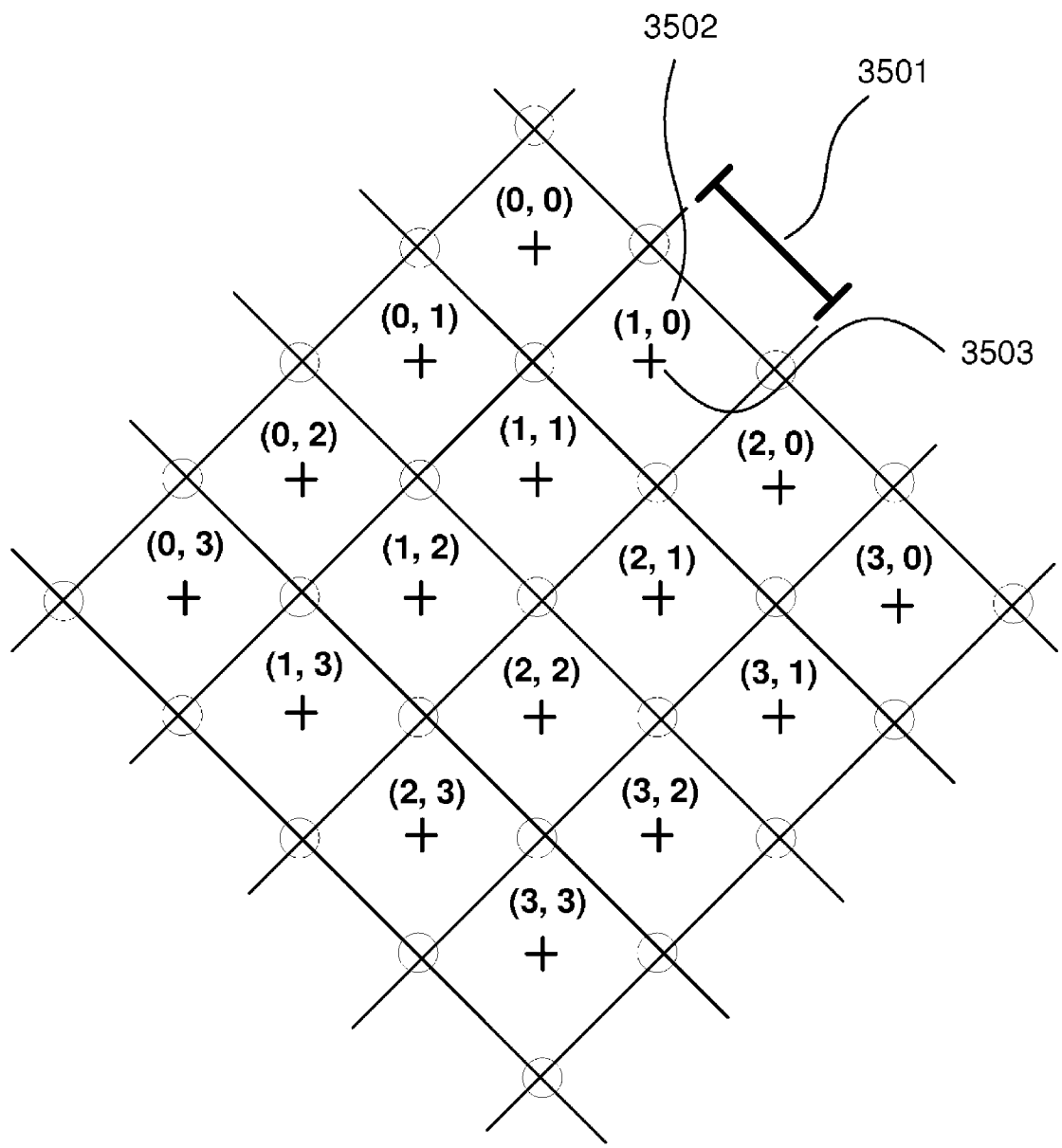
FIG. 35 illustrates an output of a 'grid navigation' barcode decoding stage.
Figure 36:
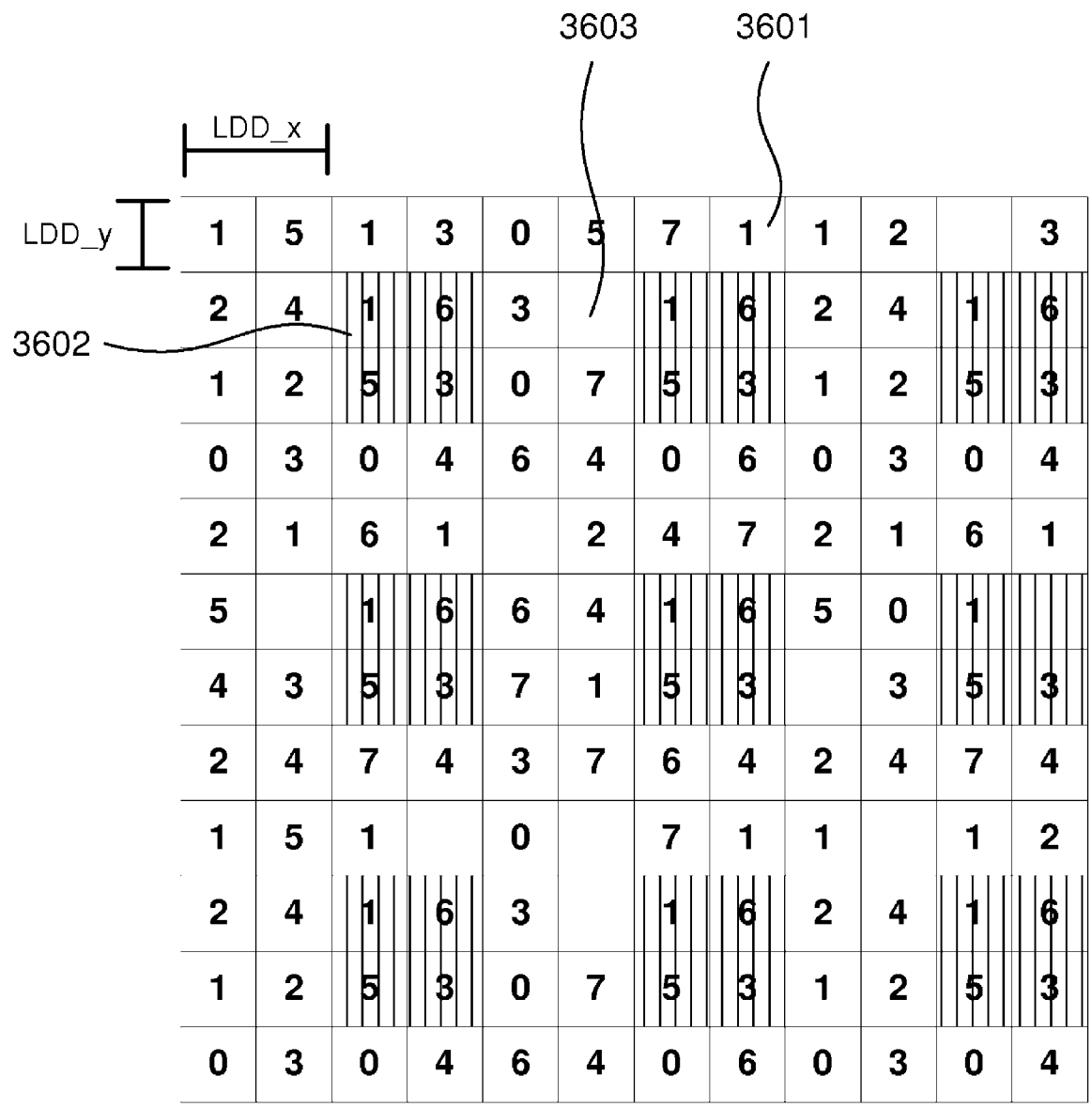
FIG. 36 illustrates an output of a 'region finding' barcode decoding stage.
Figure 37:
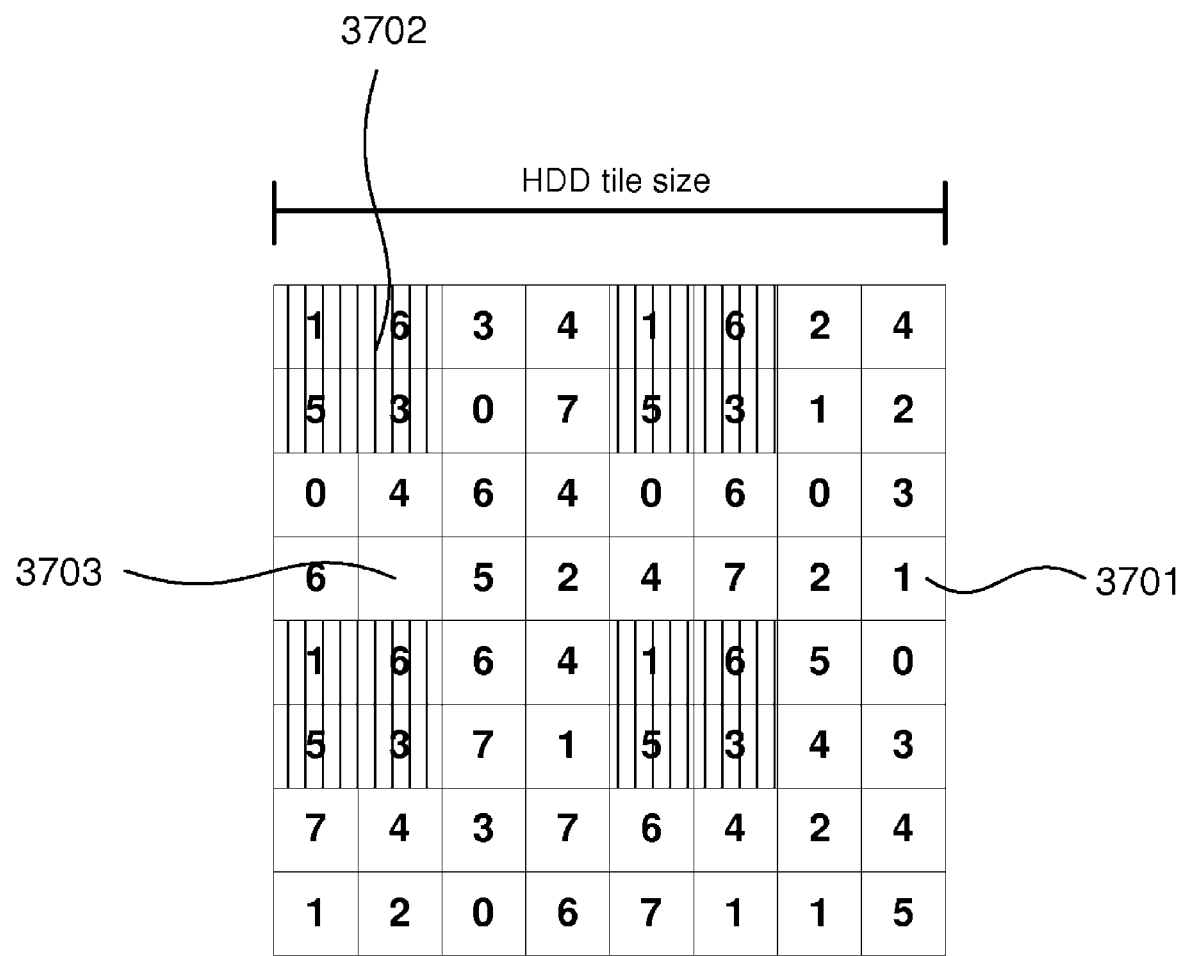
FIG. 37 illustrates an output of a 'tile aggregation' barcode decoding stage.

FIG. 34 is a flow diagram of intermediate stages of a method for barcode decoding. Decoding starts at step 3401. The first stage 'Scan barcode', 3402, converts a paper barcode into a digital scanned image using an optical scanner. Note that the paper barcode can contain multiple barcodes; this is correctly handled by the later decoding stages. The output of 3402 is a scanned image.

The second stage 'Detect dots', 3403, uses heuristics to locate/detect all dots that look like barcode dots in the scanned image. The output of 3403 is a list of (x, y) pixel coordinates of the centre of mass of located dots.

The third stage 'Constellation detection', 3404, uses a heuristic algorithm to identify the local grid spacing and orientation (constellation detection).

The fourth stage, 'Flood filling', 3405, uses a priority-based flood-fill algorithm to fit suitable grids over the list of located dots. In the typical case, the output of 3404 will be a single grid that covers the scanned image. In special cases, multiple grids of different spacing and orientation will be found covering the scanned image. For example, if the scanned image contains two or more barcodes that are disjoint, have different spacings or different orientations, a separate grid will be output for each barcode detected.

The fifth stage 'Region finding', 3406, operates on each grid from stage 3405 and divides the grid into separate regions based on data similarity using a segmentation algorithm. Typically, the output for 3406 will be a single region covering the grid. In special cases, multiple regions can be found. For example, if the grid contains two barcodes that were not successfully separated by 'grid navigation', the two barcodes will be correctly separated into two regions at this stage and two regions will be output.

The sixth stage 'Tile aggregation', 3407, condenses the repeated tiles in each region into a single tile. The repeating tile size (3312 in FIG. 33) is found by autocorrelation, then the tiles in the region are summed into a single tile. This aggregated tile is the output of 3407.

The seventh stage 'ECC decoding', 3408, performs ECC decoding by serialising the aggregated tile into LDD and HDD channels, corrects any errors using the error correcting code, and extracts the barcode data. The output of 3408 is the LDD data and HDD data.

The process finishes at 3409.

Constellation Detection

Figure 12:
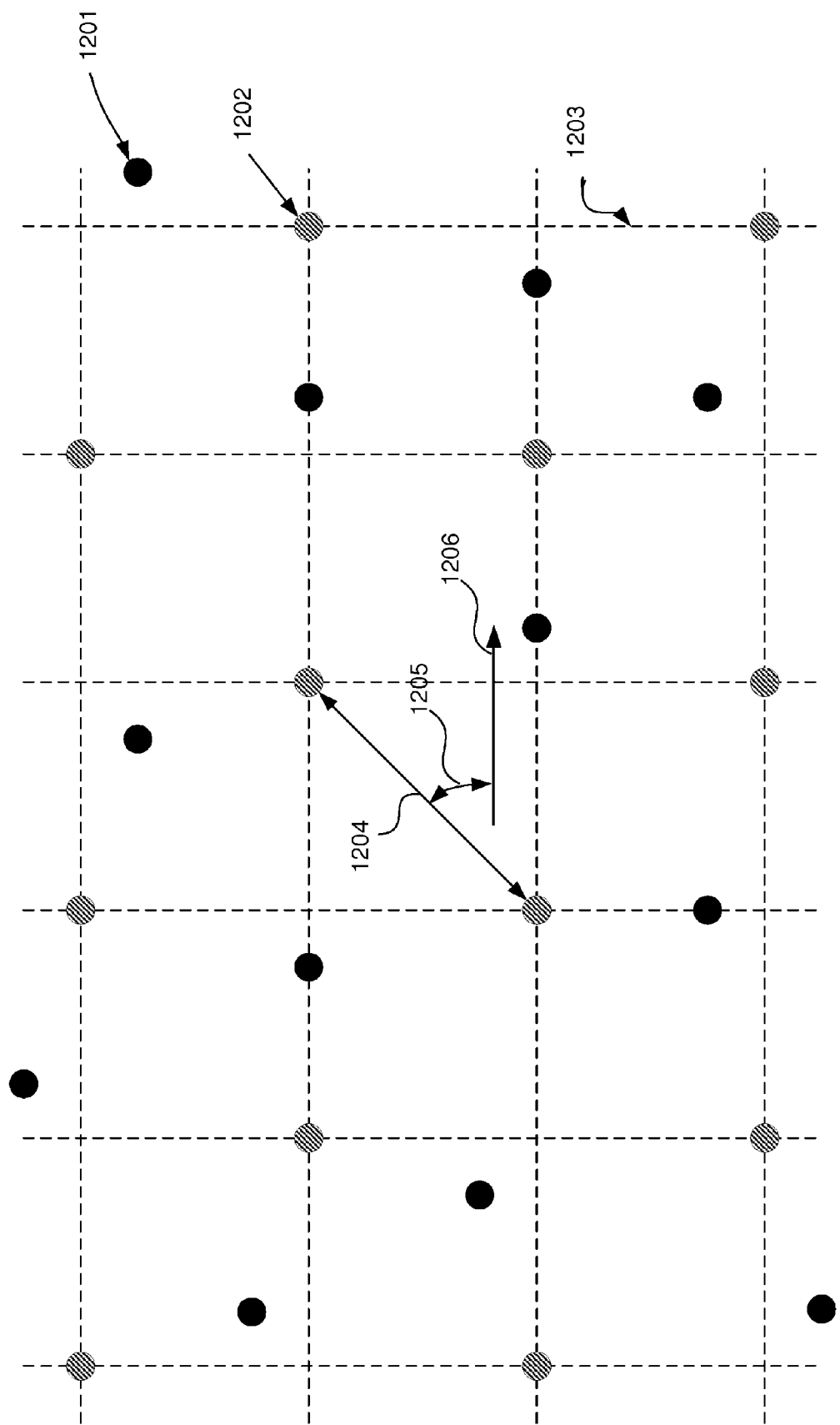
FIG. 12 illustrates a reference grid and data carrying dots.

The Constellation Detection step 3404 of FIG. 34 is now discussed in greater detail. FIG. 12 shows an example of how data carrying dots 1201 and alignment dots 1202 are arranged. A reference grid 1203 is defined by the positions of the alignment dots, which are placed at the reference grid intersection points. The data carrying dots are modulated relative to the reference grid 1203. The present disclosure provides an efficient solution for finding a basic cluster or arrangement of alignment dots with a predetermined geometric relationship between them, which will herein be referred to as a "constellation". Then, the reference grid spacing 1204 and reference grid angle (orientation) 1205 with respect to reference direction 1206 can be determined, as shown in FIG. 12.

Figure 13:
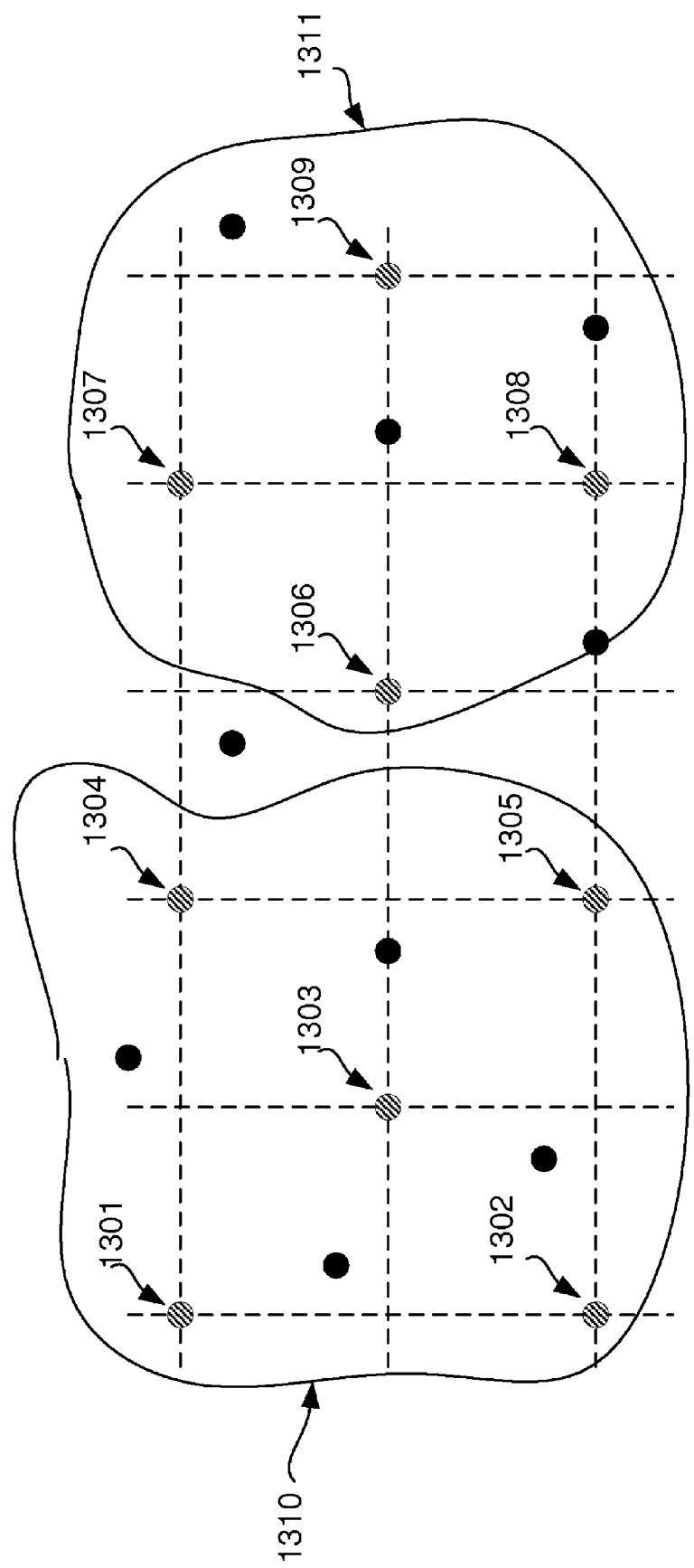
FIG. 13 illustrates two different types of basic constellations.
Figure 14:
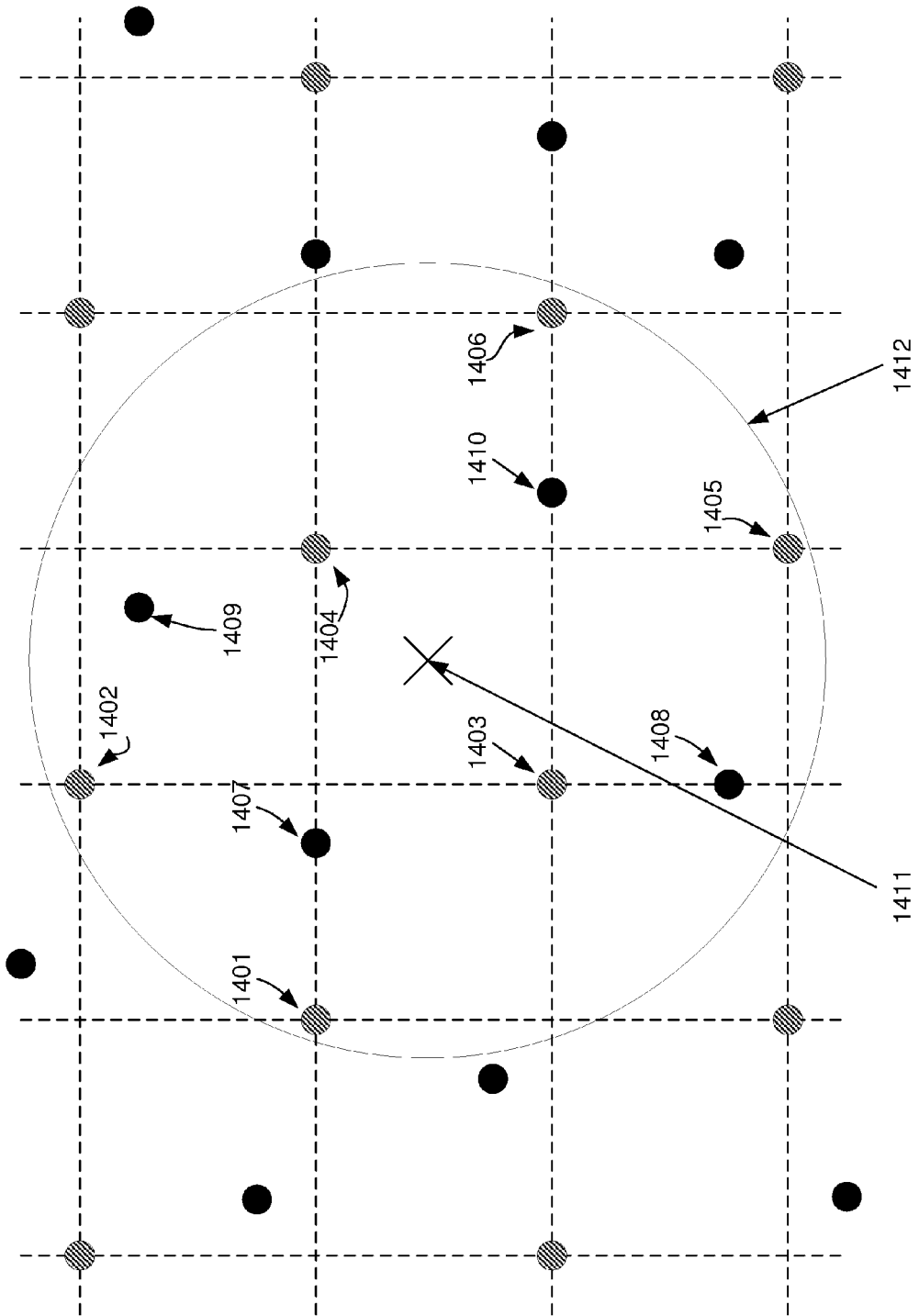
FIG. 14 illustrates a constellation in accordance with one embodiment.

FIG. 13 depicts alternate versions of the constellation used in the preferred embodiment. Region 1310 shows one type of constellation made up of five dots 1301 to 1305, while region 1311 shows a constellation made up of four dots 1306 to 1309.

Figure 15:
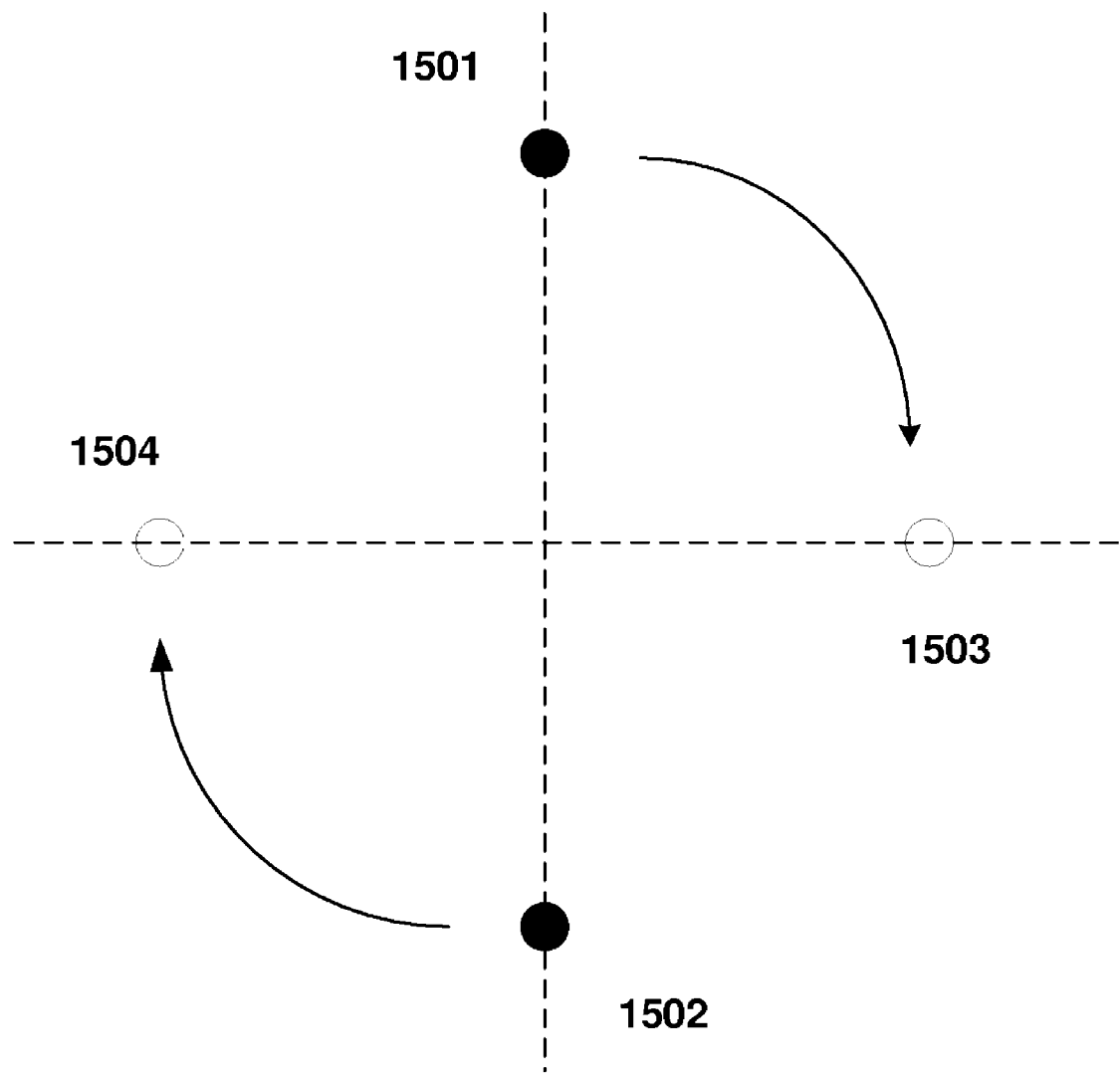
FIG. 15 illustrates a technique for rotation by 90 degrees.
Figure 16:
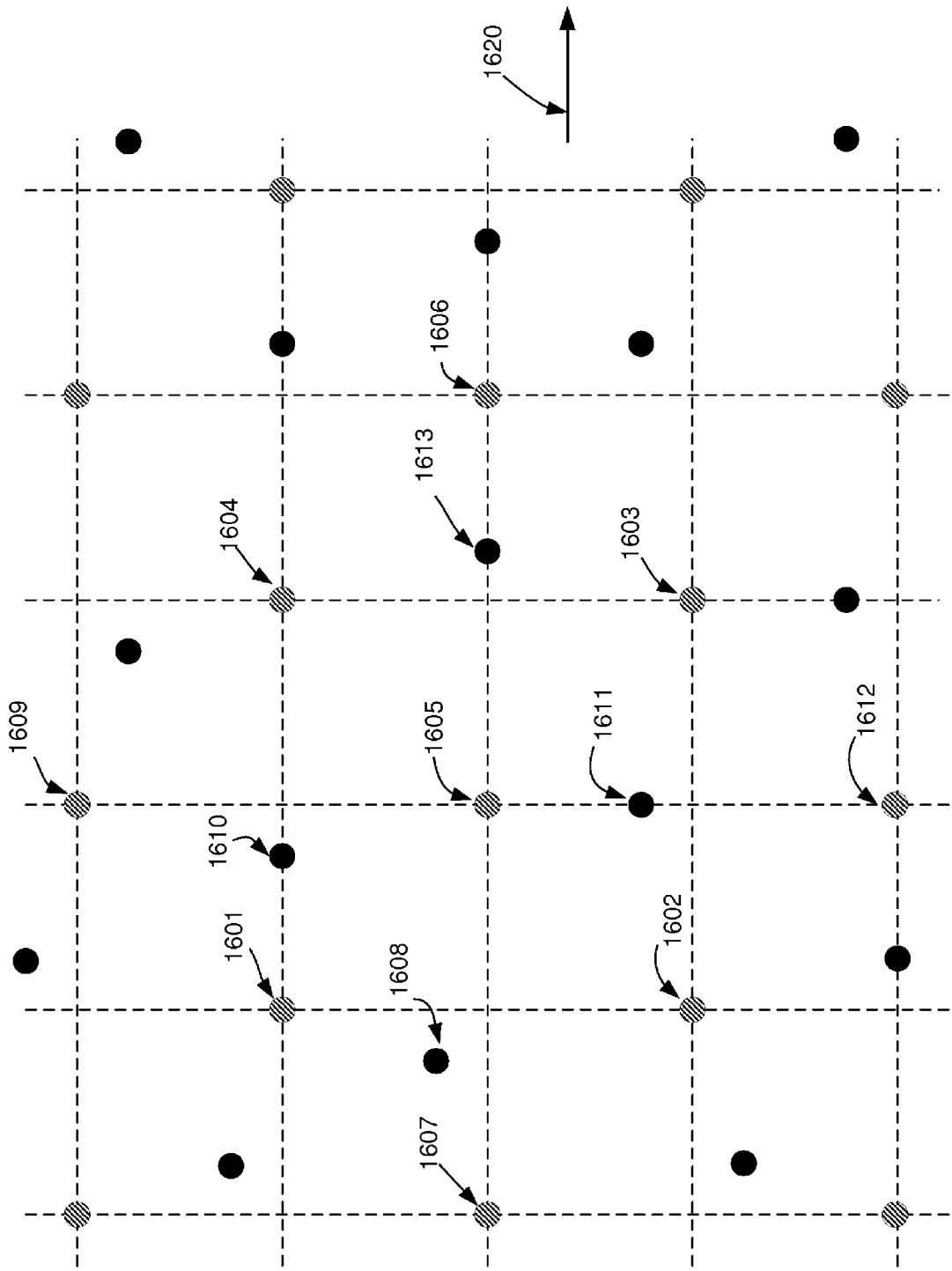
FIG. 16 illustrates an additional check to ensure an incorrect constellation is not selected.
Figure 23:
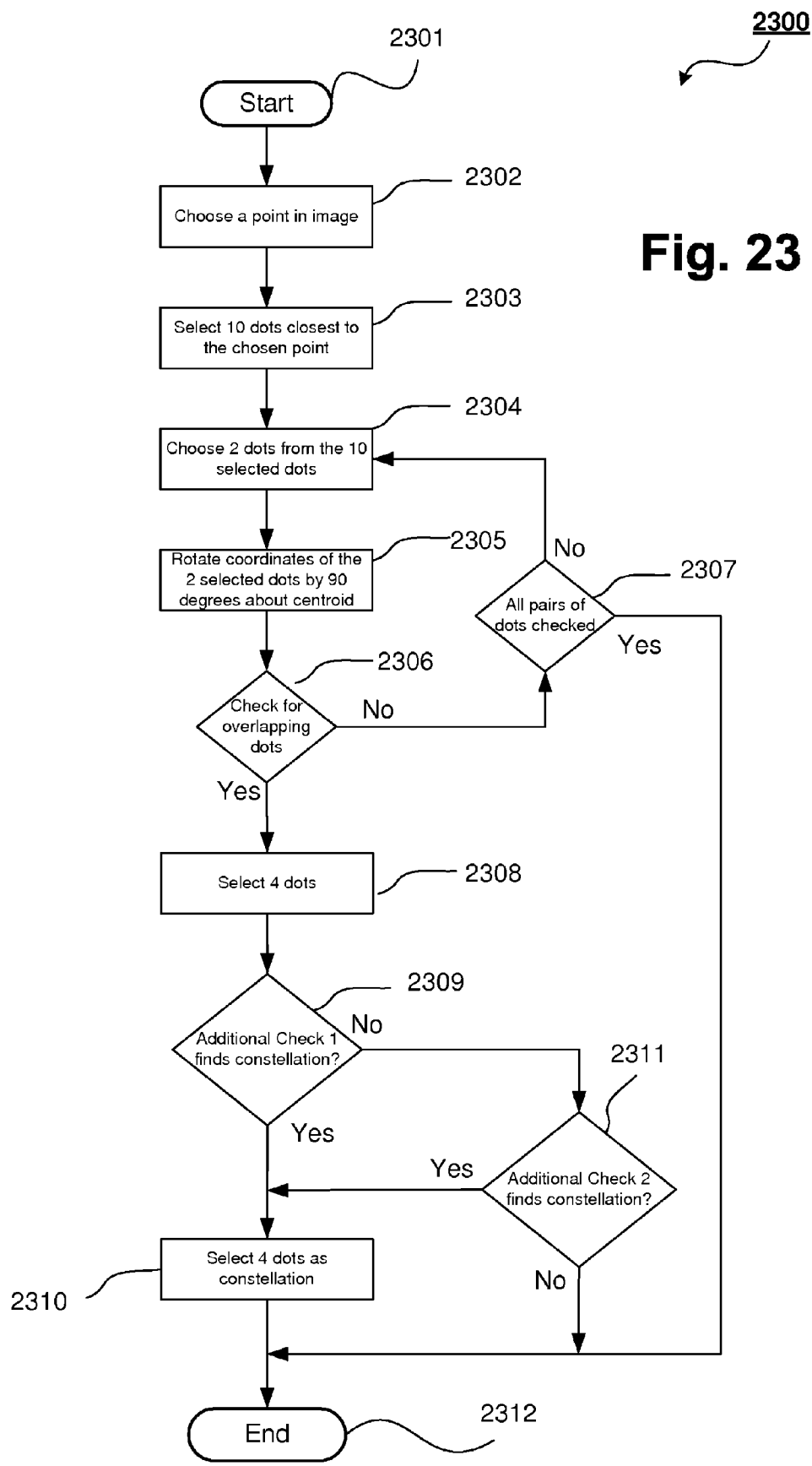
FIG. 23 is a flow diagram of a method for detecting a basic constellation.

FIG. 23 is a flow diagram 2300 of a method for detecting a constellation. Step 2301 is the start of the method. According to step 2302, an arbitrary coordinate is chosen in the image. An image can be divided into tiles of an arbitrary size depending on the desired frequency in which constellation detection is performed. As an example, a tile size of 320×320 pixels would be useful for an A4 page at 600 dpi with 14 pixel grid spacing. The centre coordinate of one of these tiles can be chosen as the arbitrary coordinate in the step 2302. In step 2303, a plurality of dots (in this example, ten dots) closest to the arbitrary coordinate are selected to perform detection of a constellation. As an example, in FIG. 14, an arbitrary coordinate 1411 is selected in the image. Region 1412 encloses the ten dots closest to point 1411, regardless of whether they are alignment dots or data carrying dots. In this example, dots 1401 to 1406 are the alignment dots while 1407 to 1410 are data carrying dots. In step 2304, a combination of two dots is chosen arbitrarily from the ten closest dots. A rotation point is set at the centroid of the coordinates of the two chosen dots. Then, the coordinates of the two chosen dots are rotated by 90 degrees about the rotation point in step 2305 to produce two corresponding rotated coordinates, or rotated positions. As shown in FIG. 15, coordinates corresponding to dots 1501 and 1502 are rotated by 90 degrees clockwise about the rotation point to produce the corresponding rotated coordinates 1503 and 1504, respectively.

Returning to FIG. 23, at decision 2306 the presence of dots in the vicinity of the rotated coordinates 1503 and 1504 is checked. If dots are located within an error range from these rotated coordinates, Yes, then the two chosen dots and the two located dots are considered to constitute collectively a potential constellation. Step 2308 depicts the selection of these four dots constituting the potential constellation. As an example, a suitable error range is a maximum of one pixel in the horizontal and/or vertical direction for a grid spacing of 14 pixels. If at decision 2306, dots are not located at the rotated coordinates within the error range, No, then control passes to decision 2307. At decision 2307, if all pairs of dots have been exhausted, Yes, then the process ends at step 2312. Otherwise, if at least one pair of dots has not been chosen, No, the process is repeated by using the next pair of dots at step 2304. For ten dots, this means there will be at most $$\binom{10}{2}$$

or 45 possible iterations. Although the nearest ten dots were chosen, it is possible to use a different number of closest dots without deviating from the spirit of the invention. Furthermore, the process of choosing pairs of dots need not be arbitrary. To minimise the computation time having to perform up to the maximum number of iterations, in one implementation the dots closer to the arbitrary coordinate 1411 are paired up earlier than dots further away.

One embodiment utilises further checks to ensure that an incorrect constellation is not detected. To demonstrate some typical cases where an incorrect constellation may be detected, consider FIG. 16. Dots 1601, 1602, 1603 and 1604 form an incorrect constellation, and these dots would result in an incorrect grid spacing and angle. The dots 1601, 1602, 1603 and 1604 form an incorrect constellation which is a factor of $\sqrt{2}$ larger than the correct constellation. This invalid constellation would return an angle of 0 degrees instead of 45 degrees relative to reference direction 1620. The correct constellation is the constellation constituting dots 1603, 1604, 1605 and 1606. In decision 2309 of FIG. 23, the presence of dots 1605-1613 are checked for their presence in the vicinity of their corresponding grid intersection points. If the number of dots found within an error range from their corresponding grid intersection points, is less than a first predefined threshold count, Yes, the dots 1601-1604 constituting a potential constellation is considered to form a correct constellation and step 2310 is executed. As an example, a first threshold count of seven dots would be appropriate for use in determining whether or not a potential constellation is correct. As a result, step 2310 of FIG. 23 finds a correct constellation formed by selecting dots 1603-1606.

Figure 17:
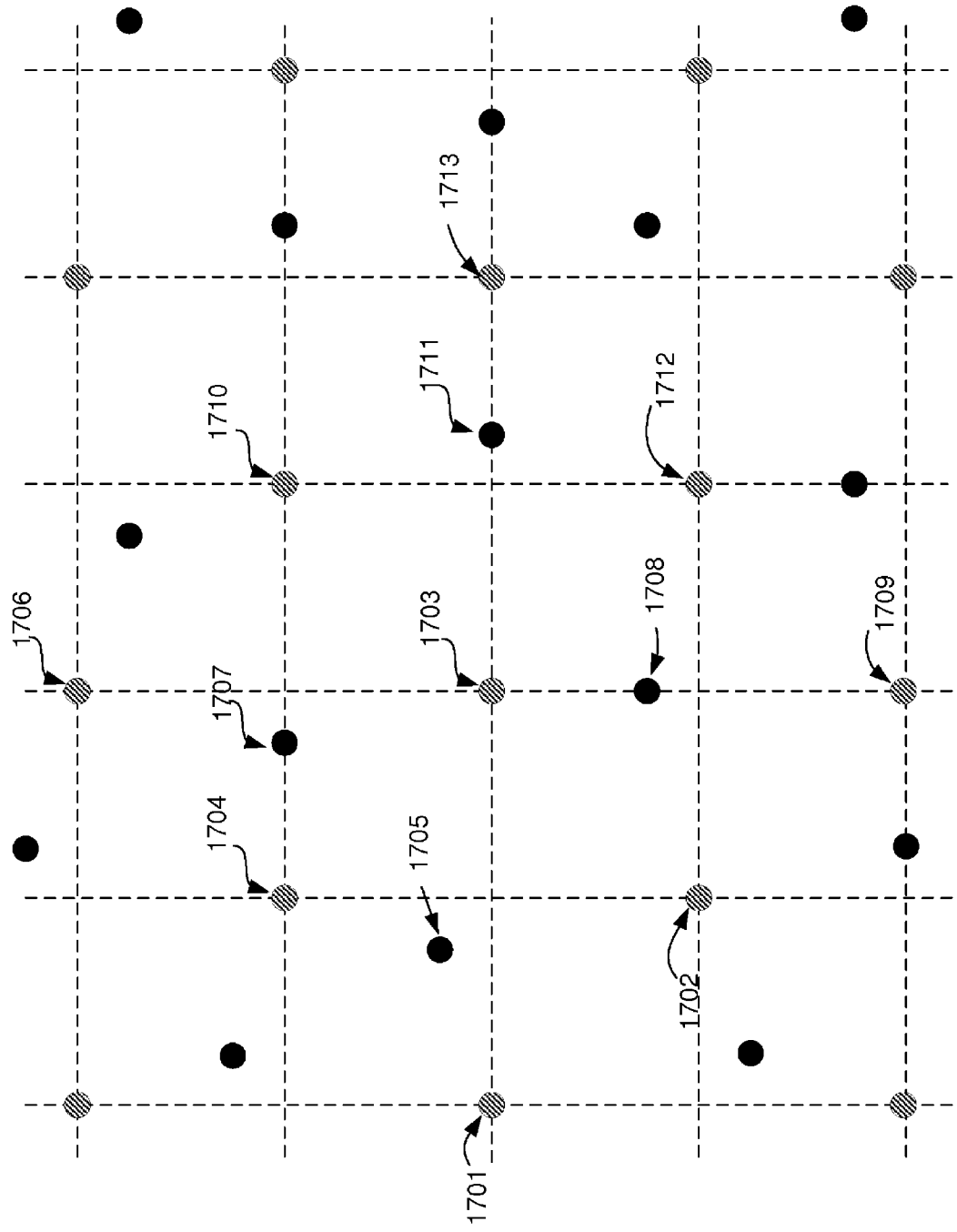
FIG. 17 illustrates another additional check to ensure that an incorrect constellation is not selected.

If the step 2309 fails to detect a constellation, No, then step 2311 is performed to further verify whether the four dots constituting a potential constellation actually form a correct constellation. As shown in FIG. 17, if the dots constituting a potential constellation from step 2305 are dots 1701 to 1704, then dots 1705 to 1713 are checked for their presence in the vicinity of their corresponding grid intersection points. If the number of dots found within an error range from their corresponding grid intersection points, is less than a second predefined threshold count, No, then the process ends at step 2312. If more dots than the second threshold count are present, Yes, then the set of four dots 1701 to 1704 constituting the potential constellation is considered to form a correct constellation and step 2310 is executed selecting dots 1701 to 1704 as a correct constellation. The process ends at step 2312.

Figure 18:
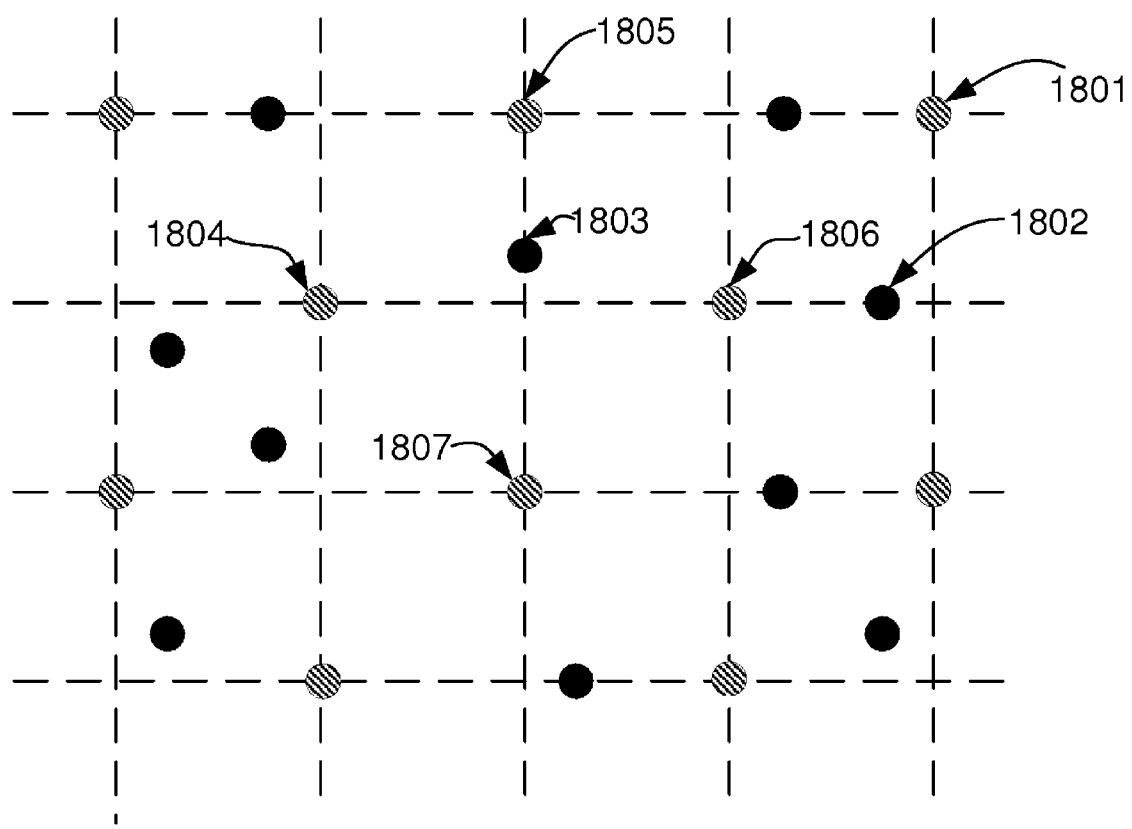
FIG. 18 illustrates detection of a basic constellation.
Figure 19:
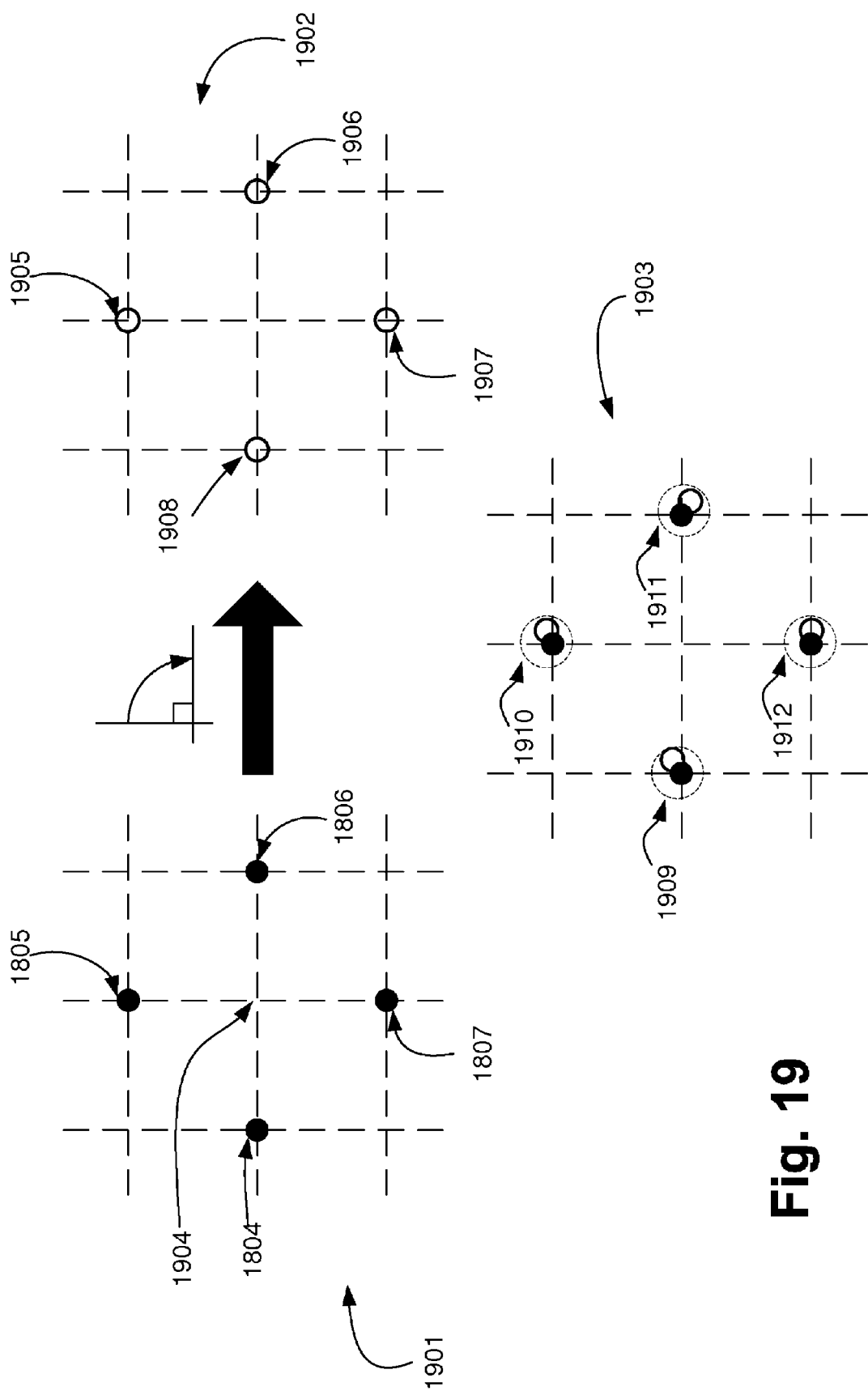
FIG. 19 illustrates rotation and overlapping dots in greater detail, for an alternative embodiment.

In another embodiment, a constellation can be detected by using the approach depicted in FIG. 18. FIG. 18 shows an alignment dot 1801 and a data carrying dot 1802. In this example, the method takes an arbitrary dot 1803 and the four closest neighbouring dots 1804 to 1807 are chosen. A rotation point is calculated for the dots 1804 to 1807. As shown in FIG. 19, a rotation point 1904, being the centroid of chosen dots 1804 to 1807, is calculated. The coordinates of the four chosen dots are rotated by 90 degrees about the rotation point 1904 to produce four corresponding rotated coordinates 1905 to 1908, as shown in diagram 1903 of FIG. 19. The presence of dots in the vicinity of the rotated coordinates 1905 to 1908 is checked. If dots are located within error range regions 1909 to 1911 from corresponding rotated coordinates, then the four chosen dots are considered to constitute a potential constellation. As a typical rule, an error range can be considered as a deviation of one pixel in horizontal and/or vertical direction for grid spacing of 14 pixels. The potential constellation is considered correct based on a number of dots found to lie within error range regions of corresponding rotated coordinates. As an example, a strict check would require that four dots are located within an error range from all four corresponding rotated coordinates. Further checks can be added to this to decrease the false positive cases. The number of checks actually utilised will depend on the particular application.

Figure 20:
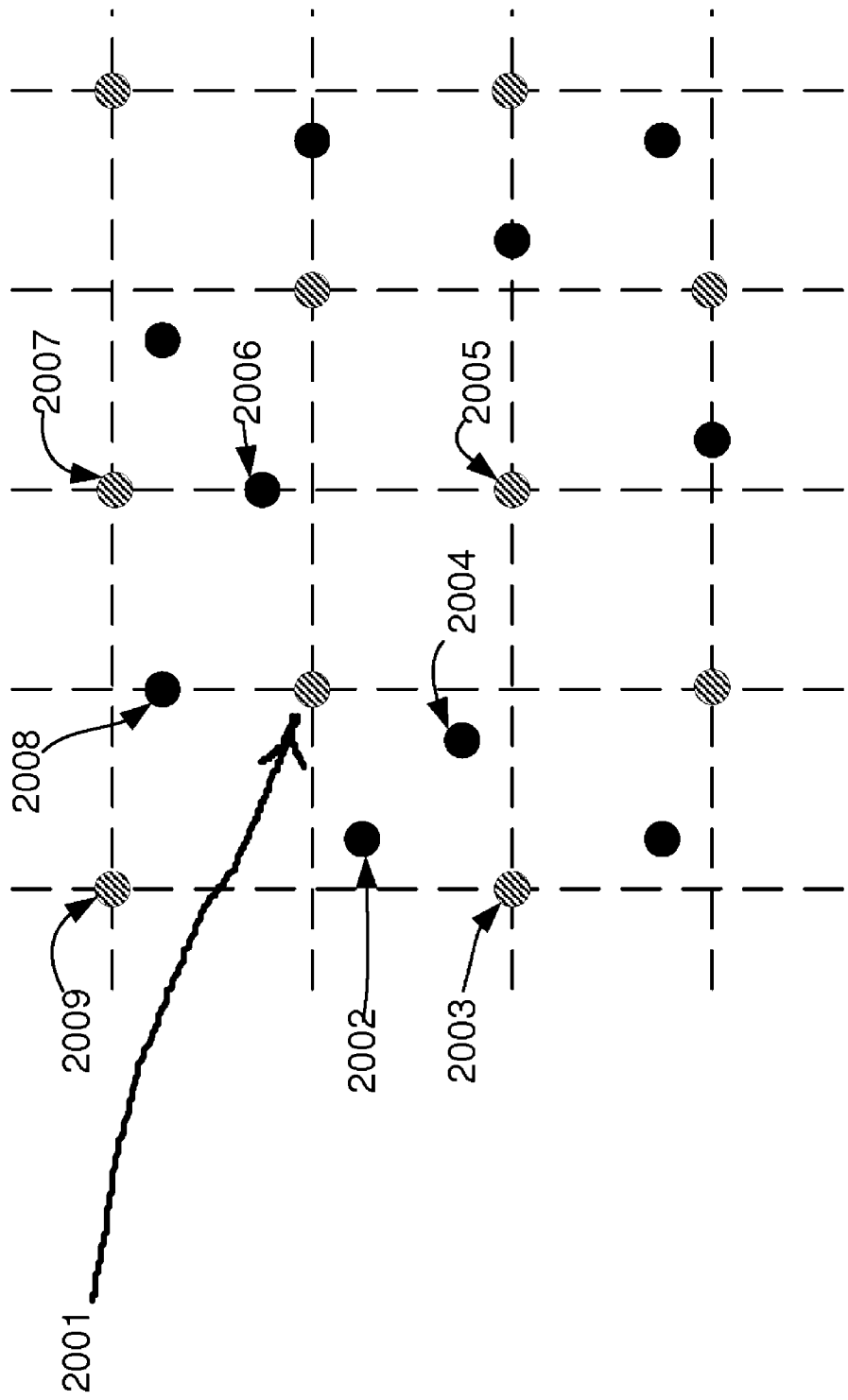
FIG. 20 illustrates an alternate embodiment for detecting a constellation.
Figure 21:
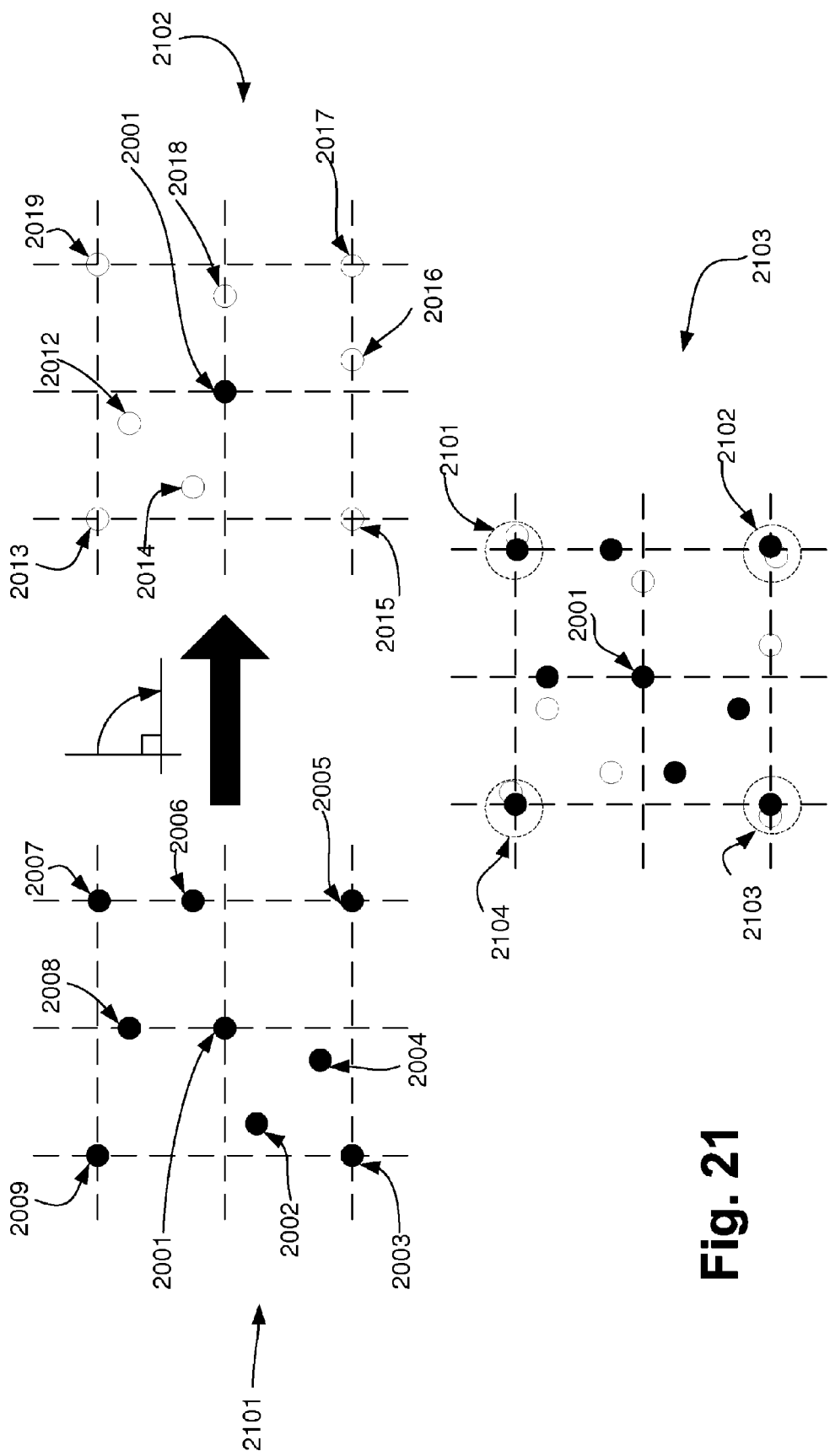
FIG. 21 illustrates rotation and overlapping dots in greater detail, for the embodiment described with reference to FIG. 20.

In another embodiment, an arbitrary dot 2001 is selected randomly, as shown in FIG. 20. The eight closest neighbouring dots 2002 to 2009 from dot 2001 are selected to form a set of dots. The coordinates of these eight closest neighbouring dots 2002 to 2009 are rotated by 90 degrees clockwise or anticlockwise, about the arbitrary dot 2001, to form a set of rotated coordinates 2012 to 2019. The presence of dots in the vicinity of the rotated coordinates 2012 to 2019 is checked. If dots are located within error range regions from corresponding rotated coordinates, shown in FIG. 21 as error range regions 2101 to 2104, then the four neighbouring dots 2003, 2005, 2007 and 2009 and the arbitrarily selected dot 2001 are considered to constitute a potential constellation. The potential constellation is considered valid based on a number of dots found to lie within error range regions of corresponding rotated coordinates. As an example, a check would require four dots to be located within an error range from corresponding rotated coordinates. Returning to FIG. 20, if the number of overlapping dots is four, then the five dots 2001, 2003, 2005, 2007 and 2009 can be considered as a basic constellation of the reference grid. The positions of the data carrying dots 2002, 2004, 2006 and 2008 are typically randomly placed but it is possible for dots to be located within an error range or the rotated coordinates. Therefore, further checks may be required by rotation at other angles including 90, 180 and 270 degrees.

Figure 22:
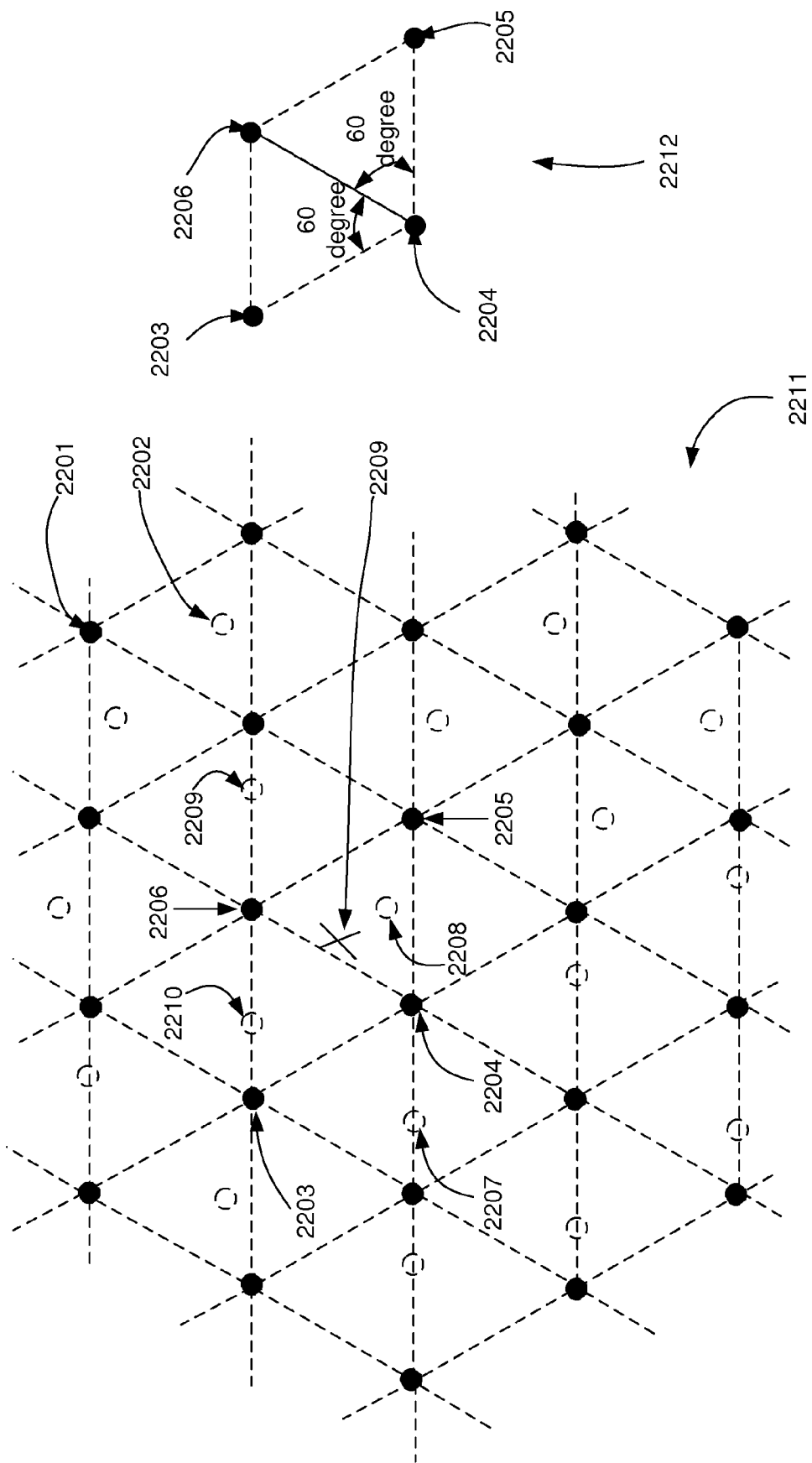
FIG. 22 illustrates an alternative embodiment with a triangular grid.

As another embodiment, FIG. 22 shows a regular triangular grid with dots 2203 to 2206 forming a constellation. An arbitrary point 2209 is chosen in an image and eight closest dots 2203 to 2210 to the point 2209 are selected. Out of the eight selected dots 2203 to 2210, any two dots, for example 2203 and 2204, are chosen. The coordinates of the dot 2203 is rotated by 60 degrees clockwise about the coordinate of the dot 2204 to calculate a coordinate 2206, and then the coordinate of the dot 2203 is rotated by 120 degrees clockwise to calculate a coordinate 2205. The presence of dots at the coordinates 2206 and 2205 lying within an error range checked. The potential constellation constituting dots 2203 to 2206 is considered correct based on whether dots are found to lie within error range regions of corresponding rotated coordinates 2205 and 2206. This process is repeated for all possible pairs of dots among the eight selected dots 2203 to 2210 until a constellation is detected or all the dot pairs have been checked. Those skilled in the art will understand that further checks can be added to this to decrease the false positive cases. The number of checks utilised will depend on the actual application.

The above described embodiments use a rotation of the coordinates by 90 degrees and this is achieved by simply swapping the x and y coordinates and negating the y coordinate. Furthermore, checking for the presence of a dot within an error range from a given coordinate is an efficient method. Therefore, this method of constellation detection uses minimal computing power.

Having detected a correct constellation in step 3404 of FIG. 34, the coordinates or the dots constituting the constellation as well as the grid spacing and angle can be used as a starting point for detecting the entire grid formed by alignment dots. By doing this, all the alignment dots are separated from the data carrying dots.

Flood-Fill Driven Barcode Navigation
Overview of the Grid Navigation Method

The method of flood-fill driven grid navigation is employed at step 3405 of FIG. 34. This step will now be described in further detail.

One aspect of the grid navigation method is to identify alignment marks among the collection of all printed marks detected in a document and to place the alignment marks onto one or more regular grids. A square grid is used in one embodiment, however the method can easily be adapted for other regular grids.

One aspect of the present disclosure provides a method of detecting a reference grid for the purposes of detecting a barcode in a printed document, the barcode consisting of alignment marks and data marks, wherein data marks are used to encode information and alignment marks are used to define a reference grid for placement of data marks, and alignment and data marks are otherwise visually indistinguishable. The method includes estimating a starting position, spacing and orientation in at least one location in the printed document, and tracking alignment marks using a variation of a flood-fill method that is known to those skilled in the art.

The method of flood-fill driven grid navigation uses the results of steps 3403 and 3404 of FIG. 34. In particular, the result of step 3403 is a collection of image coordinates of all detected marks including, in particular, alignment marks as well as any other detected marks. Only those marks forming the alignment pattern are used by the method of the present disclosure. Alternatively, means can be provided to detect the presence of a mark in the immediate vicinity of the provided nominal position on an as-needed basis.

The result of step 3404 is a collection of at least one seed point, where information supplied for each seed point includes image coordinates of at least one mark that has been identified at step 3404 as a valid alignment mark as well as an estimation of grid angle and spacing at those image coordinates. Alternatively, means can be provided at step 3404 to detect seed points on an as-needed basis. The number of seed points is a trade-off between performance and accuracy.

The result of the method is a collection of one or more grid data structures, where each grid data structure includes a collection of grid nodes. Each grid node stores image coordinates associated with the position of the node in the grid.

The method works in two consecutive phases: an initialization phase followed by a grid growth phase. During the initialization phase, grid data structures are initialized using the results of step 3404. During the grid growth phase, alignment marks are identified and new grid nodes are added to the grids one at a time, in a manner similar to what is known in the industry as flood fill or seed fill method. The order in which new grid nodes are evaluated and added is determined by a measure of confidence that the node is indeed a valid alignment node. Additionally, a check is made during each iteration to see if adding a new node causes two grids to overlap and an attempt is made to combine overlapped grids.

Data Structures

Data structures used by a method of the present disclosure include grid list, priority queue and territory array.

Grid list is a collection of grid data structures. Each grid data structure represents one connected portion of the grid in the process of being tracked. Information associated with each grid data structure includes grid angle and spacing and a collection of grid nodes accessible by their grid coordinates. Information associated with each grid node includes image coordinates associated with the node, an indication showing that a valid mark associated with this node has been found and another indication showing that the node has been processed through the priority queue. Means are also provided to associate grid node with its parent grid data structure.

Priority queue is a collection of grid nodes along with their associated confidence values. Priority queue supports efficient operations of adding a new node and removing the node with the highest confidence.

Territory array is a supplementary data structure used to identify which grid (if any) is occupying a particular area on the image for the purpose of detecting overlapped grids. The image is divided logically into non-overlapping rectangular regions, or territories, of equal size. Each territory can be either unclaimed or claimed by a particular grid. Preferably, the size of each territory should be as small as practicable but no smaller that the size of the largest expected grid cell. The present embodiment of the method uses territories of size 32 by 32 pixels, though other territories may equally be practiced.

The choice of data structures reflects various trade-offs between simplicity, performance and memory requirements. Those skilled in the art will recognize that other data structures may be used to the same effect.

Detailed Description of the Grid Navigation Method

Figure 24:
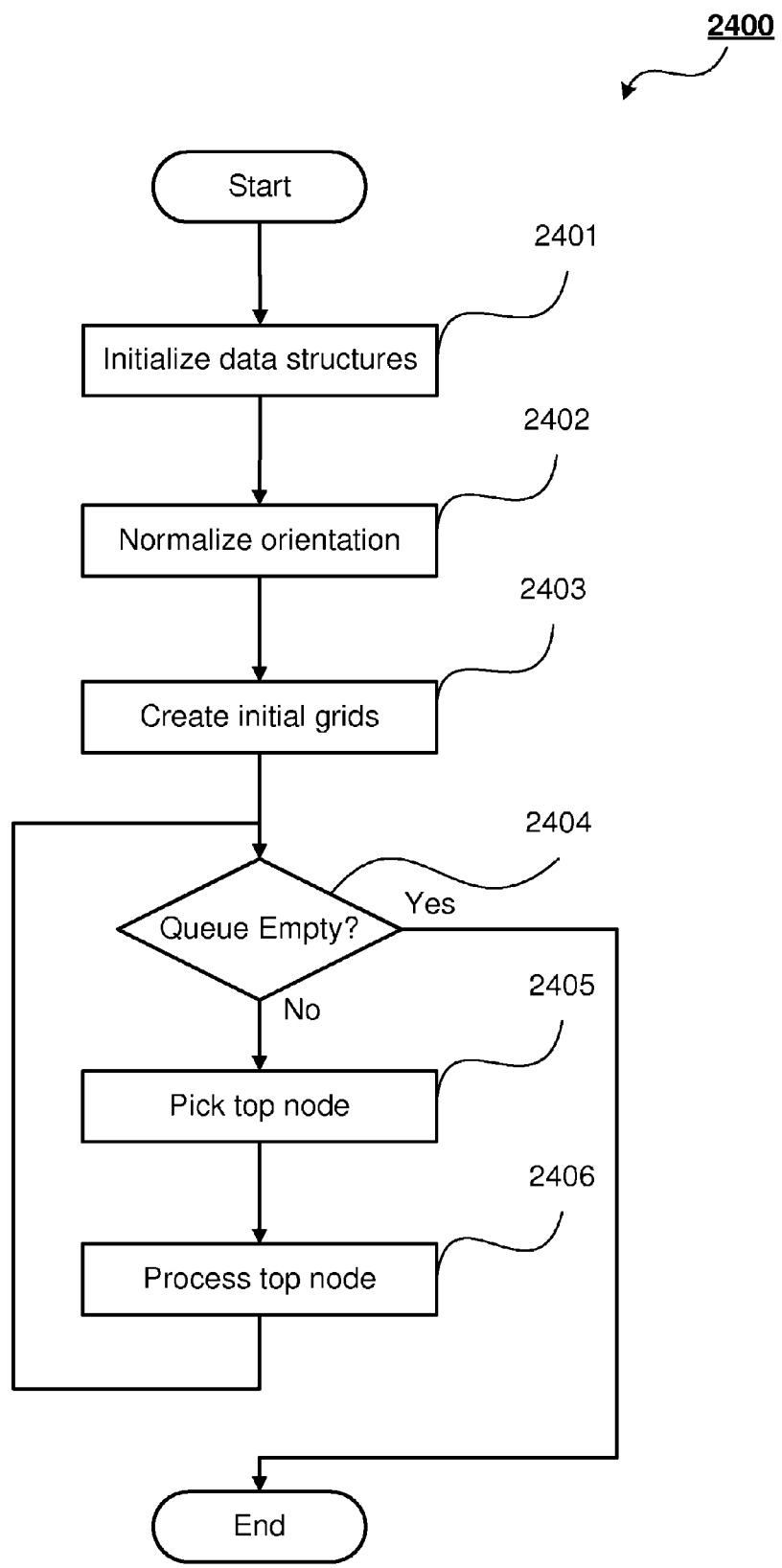
FIG. 24 is a flow diagram of a method of flood-fill driven grid navigation.

FIG. 24 is a flow diagram 2400 of a method of flood-fill driven grid navigation. An initialization phase is performed first at steps 2401, 2402 and 2403, followed by grid growth phase at steps 2404, 2405, 2406.

At step 2401, internal data structures are initialized as follows: grid list is set to empty; priority queue is set to empty; and each territory in the territory array is set to unclaimed.

At step 2402, orientation of the seed points is normalized, as will be described in greater detail below.

At step 2403, initial grids are created from seed points and the priority queue is pre-populated. The following actions take place for each seed point.

A new grid data structure is created and added to the grid list. Grid orientation and spacing are initialized from seed point orientation and spacing.

A new grid node is added to the new grid data structure at the grid origin. Grid node image coordinates are set to the corresponding seed point coordinates and the node is marked as having an associated mark. The newly created node is then evaluated and conditionally added to the priority queue as further described later in this document.

The main loop of the method is represented by steps 2404, 2405 and 2406. At step 2404, the method checks whether the queue is empty. If the queue is empty, Yes, the method terminates at an End step. If the queue is not empty, No, control passes to step 2405, which selects a top node. The node with the highest confidence is removed from the queue at step 2405 and processed at step 2406. Control then returns to step 2404 and the process repeats until the queue is empty as determined at step 2404.

Angle Normalization

Grid angles estimated at step 3404 of FIG. 34 have inherent ambiguity due to the rotational symmetry of the grid. For performance reasons, it is desirable to normalize the angles in such a way that angular differences are small for similarly oriented grids. In particular, a specific ANGLE_TOLERANCE constant is used to define an upper limit on the angular difference of the orientation for the grids to be considered similar. A suitable value of ANGLE_TOLERANCE can be determined experimentally. The value of ANGLE_TOLERANCE in the present embodiment is set to 0.02 radians.

Figure 25:
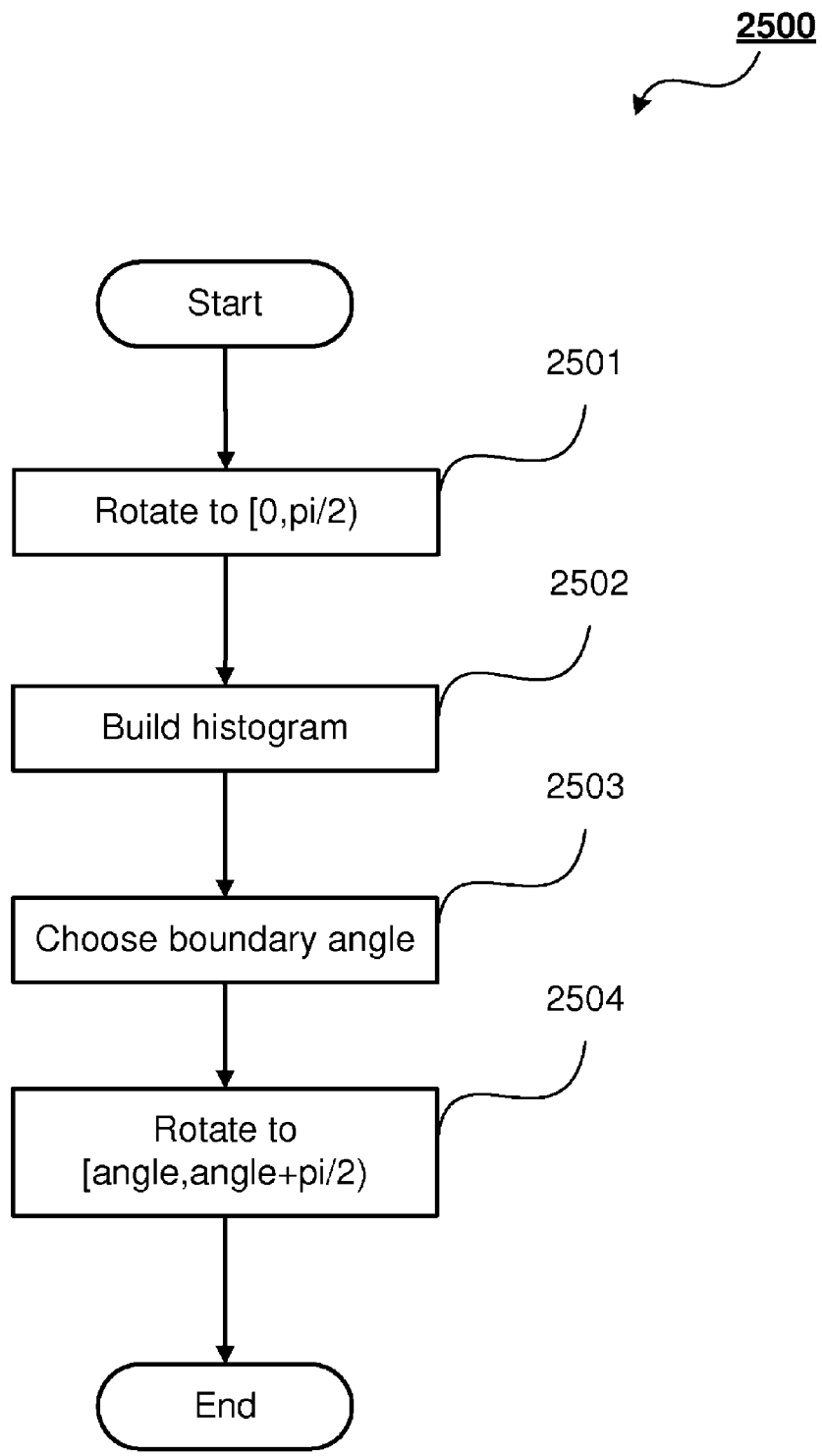
FIG. 25 is a flow diagram of a method of grid angle normalization.

The process of angle normalization occurs at step 2402 of FIG. 24 and is illustrated in greater detail with reference to FIG. 25, which is a flow diagram 2500 of a method of grid angle normalization.

At step 2501, grid angles for all seed points are brought into a range from 0 to 90 degrees by taking a modulo of 90 degrees.

At step 2502, a histogram of grid angles is created/built using data for all available seed points. Histogram bin size is set to the value of ANGLE_TOLERANCE constant.

At step 2503, the value of boundary angle is determined/chosen as being the centre value of the bin with the smallest count.

At step 2504, grid angles for all seed points are brought into range from boundary angle to boundary angle plus 90 degrees. This is accomplished by adding 90 degrees to the angle of orientation whenever said angle is less than boundary angle.

The step of angle normalization is optional. If omitted, the ambiguity will have to be resolved at the time grid orientations are compared when checking for overlapped grids at step 2705 on FIG. 27.

Grid Node Evaluation

During the grid node evaluation step, any missing neighbouring nodes of the current node are created, confidence of the node is calculated, and the node is conditionally added to the priority queue. The confidence is calculated as a sum of distance metrics for the node itself and for all neighbours of the current node.

For the current node, the distance metric is set to MAX_DIST if the node has a mark associated with it or to zero otherwise. For the neighbouring nodes, distance metric is calculated as follows:

If the neighbouring node does not have a mark associated with it, then the metric is zero; otherwise, the metric is MAX_DIST less square of the distance between the actual position and the expected position of the mark. If the result is negative, the metric is set to zero.

MAX_DIST constant denotes maximum allowed distance squared between actual and expected positions of the mark. In one embodiment, the value for MAX_DIST is 9, which corresponds to a maximum distance of 3 pixels.

Those skilled in the art will recognize that other methods of calculating the confidence are possible. The choice is determined by an engineering trade-off between accuracy and performance. In particular, calculations may include information about the size and shape of the marks, the position of other alignment marks in the grid, etc.

Figure 26:
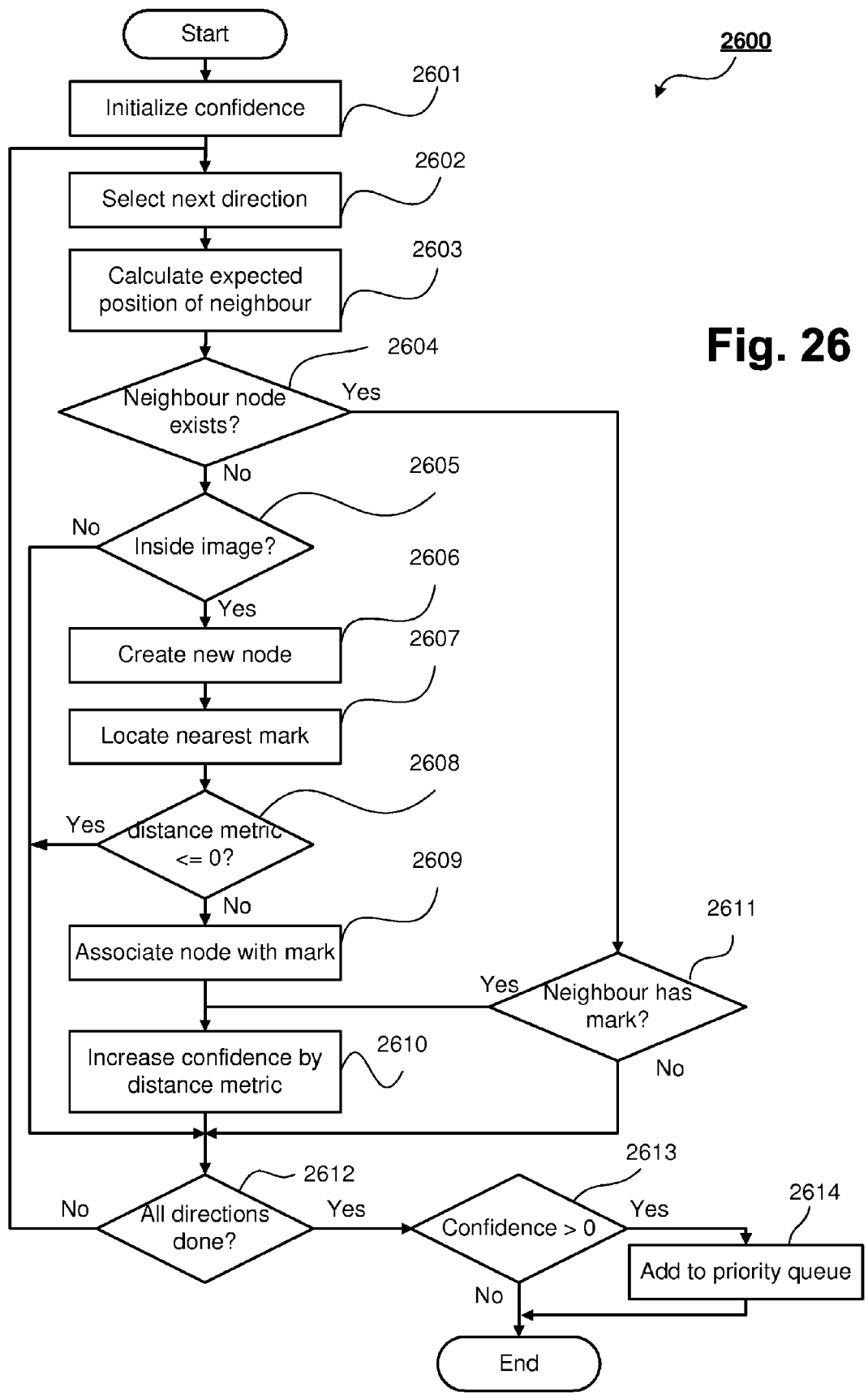
FIG. 26 is a flow diagram of a method of grid node evaluation.

FIG. 26 is a flow diagram 2600 of a method of grid node evaluation. First, at step 2601 a confidence value is initialized to zero if the current node does not have a mark associated with it, or to the value of MAX_DIST otherwise. Then steps 2602 to 2612 are repeated for all grid directions. In case of a rectangular grid, four directions are evaluated, namely: up, down, left and right.

The current grid direction is selected at step 2602. The expected position of the mark is calculated at step 2603 by rotating the grid displacement vector according to the current grid direction and adding it to the position of the current node. Grid displacement vector is calculated as a unit vector multiplied by the grid spacing and rotated by the grid angle. For efficiency, grid displacement vectors may be pre-calculated and stored in respective grid data structures.

At step 2604, a check is made in the grid data structure for the presence of the neighbouring node in the current direction. If the neighbouring node has not yet been created, No, an attempt to create a new node is performed at steps 2605 to 2609. First, expected node coordinates are compared with image boundaries at step 2605. If the coordinates fall outside of the image boundaries, no further action is performed for the current direction and control passes to step 2612. Otherwise, if at step 2605 the coordinates fall inside the image boundaries, Yes, a new node is created and initialized with the expected position at step 2606. Then the mark nearest to the expected position is located at step 2607. The distance metric of the mark is checked at step 2608. If the metric is less than or equal to zero, Yes, the mark is considered to be too far away and no further actions are performed for this node and control passes to step 2612. Otherwise, if the distance metric is not less than or equal to zero, No, the node is marked as having an associated mark and the position of the node is updated with the position of the current mark at step 2609. The confidence is then increased by the metric at step 2610.

If the node was found at step 2604, Yes, the node is further checked for the presence of an associated mark at step 2611 and, if so, Yes, the confidence is updated at step 2610 as described above. If at step 2611 the node is found not to have an associated mark, No, control passes to step 2612.

Step 2612 determines whether all directions have been processed. If all directions have not been processed, No, control returns to step 2602. Once all the grid directions have been processed as determined at 2612, Yes, control passes to step 2613. The resulting confidence is checked at step 2613 and if found to be greater than zero, Yes, the node along with its confidence is added to the priority queue at step 2614. Control then passes to an End step and the method terminates. If the confidence is not greater than zero, No, control passes to an End step and the method terminates.

Highest-Confidence Node Processing

Figure 27:
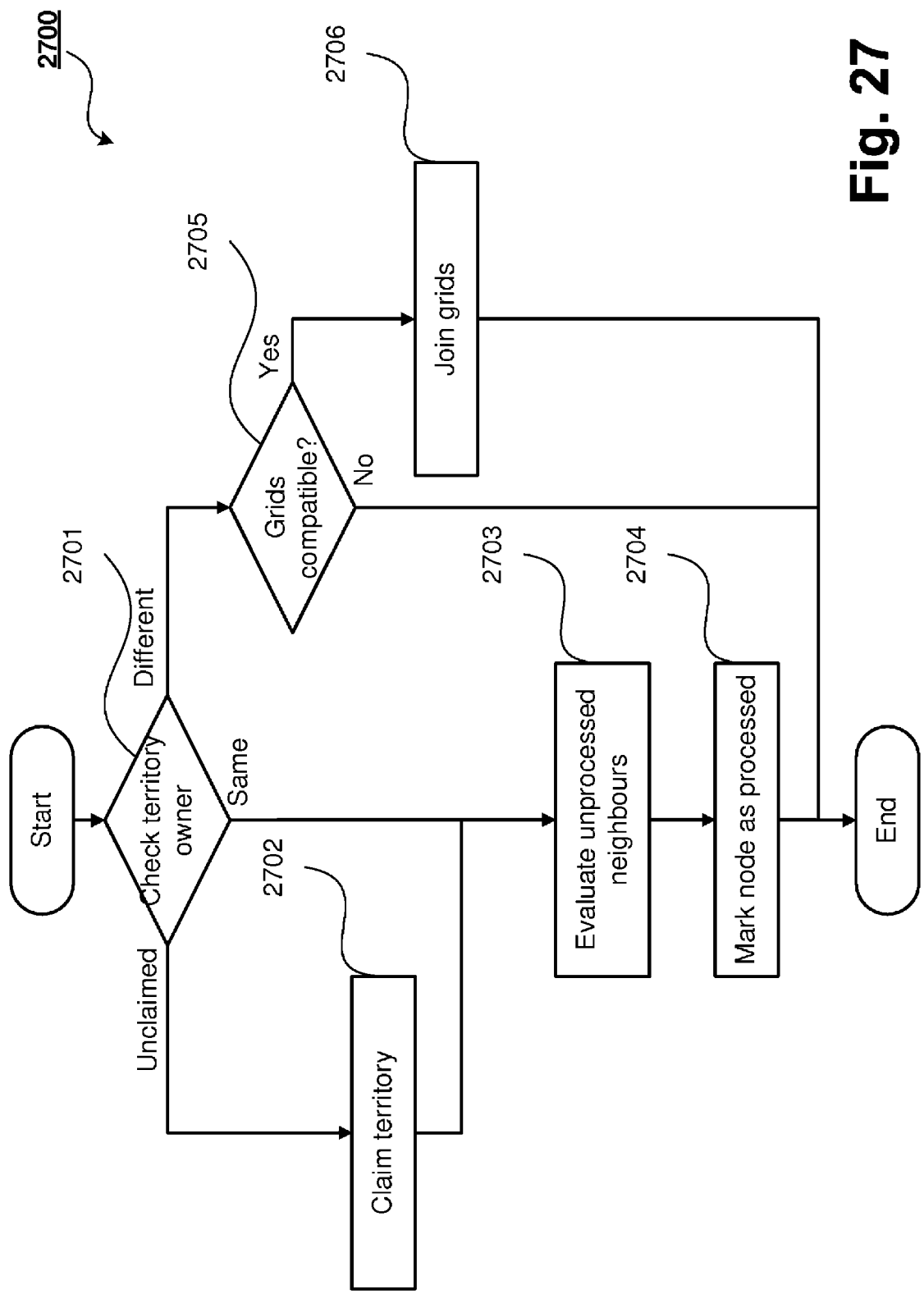
FIG. 27 is a flow diagram of a method of processing of a grid node with a high level of confidence.

The processing of the highest-confidence node takes place at step 2406 of FIG. 24 and is illustrated further in FIG. 27, which is a flow diagram 2700 of a method of processing of a grid node with a high level of confidence First, a special case of merging grids is checked and acted upon at steps 2701, 2702, 2705 and 2706. At step 2701 territory array is consulted at the position of the current node. If the territory owner is the same as the current grid, Same, no special actions are taken and control passes to step 2703. Otherwise, if the territory has not yet been claimed at step 2701, Unclaimed, the owner of the territory is set to the current grid at step 2702 and then control passes to step 2703. Otherwise at step 2701, if the owner of the territory is different from the current grid, Different, an attempt is performed to join the grids at steps 2705 and 2706.

At step 2705 the two grids, namely the grid of the current node and the territory owner at the position of the current node, are checked for compatibility. The grids are considered compatible if the difference in their orientation is smaller than ANGLE_TOLERANCE and the difference in spacing is smaller than SPACING_TOLERANCE. SPACING_TOLERANCE is a constant determined experimentally, the value used in the present embodiment is 1.5 pixels.

In the case of a negative outcome at step 2705, No, control passes to an End step and the method terminates. In case of a positive outcome at step 2705, Yes, the grids are merged at step 2706 as follows.

First, a displacement vector is calculated by subtracting the origin of the first grid from the origin of the second grid. Then the offset in grid coordinates is calculated by rotating the coordinates of said displacement vector by the angle of the first grid, dividing the result by the spacing of the first grid and rounding the results to the nearest integer values.

After the grid offset has been calculated, all nodes from the second grid are transferred to the first grid and then the second grid is removed from the grid list. The position of the node in the first grid is determined by adding grid offset to the position of the node in the second grid. At the same time those territories marked in the territory array as owned by the second grid are re-labelled as being owned by the first grid.

Further processing of the current node is skipped in order to avoid creating a duplicate of the same node. Control passes from step 2706 to an End step and the method terminates.

At step 2703, neighbouring nodes of the current node are evaluated for all grid directions. If a node exists and is not marked as processed, it is evaluated as previously described with respect to FIG. 26.

Control passes from step 2703 to step 2704, in which the current node is marked as being processed. Control passes from step 2704 to an End step and the method terminates.

Further Embodiments

Disclosed herein is a method of determining the correct orientation of an information mark that contains digital data and associated Error Correction Code (ECC) data for the protection of the digital data, where decoding of the ECC is attempted for one possible orientation of the information mark and if ECC decoding fails then a different possible orientation of the information mark is adopted and decoding of the ECC is again attempted.

Further disclosed herein are a method and system for detecting a basic constellation of a reference grid formed by alignment marks/dots in an image. This grid can have various predetermined values for spacing and orientation, and data carrying dots are modulated with reference to the grid. A basic constellation constitutes only alignment dots and the alignment dots also need to be separated from data carrying dots. The basic constellation detection identifies the grid spacing and orientation, which in one implementation is used in a subsequent phase to expand and detect the whole reference grid.

Further disclosed herein are a method and system for tracking alignment marks in printed documents, wherein the alignment marks form a grid-like pattern. According to one aspect of the present disclosure, there is provided a method of detecting reference grid without reference to other marks in a printed document.

According to one aspect of the present disclosure, there is provided a method for detecting a constellation of dots which are part of a reference grid, the method comprising the steps of: choosing an arbitrary coordinate in an image; selecting a plurality of dots closest to the chosen coordinate; choosing two dots from the selected closest dots; rotating the chosen two dots by 90 degrees and determining rotated positions; checking for dots at the rotated positions; checking for dots within an error range about the rotated positions; and selecting a plurality of dots as the constellation. In one embodiment, there are eight selected closest dots.

According to another aspect of the present disclosure, there is provided a method for detecting a constellation of dots which are part of a reference grid, the method comprising the steps of: selecting an original set of dots, the original set of dots including a chosen dot and four closest neighbouring dots of the chosen dot; rotating four dots about a rotation centre to produce a rotated set; checking for overlapping dots in the original set and the rotated set; and determining whether to select a basic constellation of dots, based on a number of overlapping dots.

According to a further aspect of the present disclosure, there is provided a method to detect a constellation of dots which are part of a reference grid, the method comprising the steps of: selecting a dot and selecting eight closest neighbours of the selected dot to form an original set of dots; rotating the eight closest neighbours about the selected dot to produce a rotated set of dots; checking for overlapping dots between the original set of dots and the rotated set of dots; and determining whether to select a basic constellation of dots, based on the number of overlapping dots. In one embodiment, the constellation is a geometric shape dependent on the shape of the reference grid. In another embodiment, the grid has various predetermined inter-grid distances and orientations. In a further embodiment, the number of dots in the constellation varies. In a yet further embodiment, at least one of a size and shape of a dot varies.

According to a yet further aspect of the present disclosure, there is provided a method for rotating a plurality of dots about a selected position by a predefined angle to find a rotated set of dots, comprising: choosing a point in an image and selecting a plurality of dots around that point based on a predefined rule, the selected plurality of dots forming an original set of dots; calculating a rotation centre according to a predefined rule; and rotating the selected dots about the rotation centre to form a rotated set of dots. In one embodiment, the original set of dots and the rotated set of dots are compared to find overlapping dots to detect a particular geometric pattern.

According to another aspect of the present disclosure, there is provided a method of detecting a reference grid for the purposes of detecting a barcode in a printed document, the barcode consisting of alignment marks and data marks, wherein data marks are used to encode information and alignment marks are used to define a reference grid for placement of data marks, and alignment and data marks are otherwise visually indistinguishable, the method comprising the steps of: estimating a starting position, spacing and orientation in at least one location in the printed document; and tracking alignment marks using a variation of a flood-fill method. In one embodiment, the order in which marks are processed is influenced by a measure of confidence that the mark is a valid alignment mark. In another embodiment, the measure of confidence is calculated based on the position of the mark relative to other alignment marks. In a further embodiment, more than one grid is tracked simultaneously using more than one starting position and where similarly-oriented overlapped grids are merged together.

According to a further aspect of the present disclosure, there is provided a method of determining a correct orientation of an information mark that contains digital data and associated ECC data for the protection of the digital data, the method comprising the steps of: attempting decoding of the ECC for one possible orientation of the information mark; and if ECC decoding fails, then adopting a different possible orientation of the information mark and decoding of the ECC is again attempted.

According to a yet further aspect of the present disclosure, there is provided a method for decoding a low visibility barcode (LVBC) in an image, the method comprising the steps of: detecting a plurality of dots that form the low visibility barcode; storing coordinates associated with each of the detected dots; analysing the stored coordinates to identify a regular grid forming a carrier signal of the low visibility barcode; determining orientation and spacing for a modulated grid; demodulating information stored in a position of each dot; determining a start of message data of the low visibility barcode; and assembling a decode message.

INDUSTRIAL APPLICABILITY

It is apparent from the above that the arrangements described are applicable to the computer, data processing, printing, and imaging industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A computer-implemented method for identifying a constellation of alignment marks within an arrangement of computer readable marks in an image, the arrangement of computer readable marks including alignment marks and data carrying marks, wherein the alignment marks define a reference grid within the arrangement of computer readable marks and the data carrying marks are modulated with respect to the reference grid to encode data, said method comprising the steps of:
   selecting at least two marks from the arrangement of computer readable marks;
   determining a rotation center with reference to respective positions of the selected marks;
   determining rotated positions for each of the selected marks by rotating each of the selected marks by a predetermined angle about the rotation center;
   locating in the arrangement of computer readable marks, for each rotated position, a mark having a position that is less than a predetermined threshold from the respective rotated position;
   identifying the selected marks and the located marks as the constellation of alignment marks; and
   storing the identified constellation for use in decoding the data carrying marks.

2. The method according to claim 1, comprising the further steps of:
   determining a spacing and orientation of the identified constellation;
   determining a set of expected mark locations, based on the spacing and orientation of the identified constellation; and
   verifying the identified constellation of alignment marks, when at least a predetermined proportion of the expected mark locations match locations of marks in the arrangement of computer readable marks.

3. The method according to claim 1, wherein the arrangement of computer readable marks is a subset of marks forming a low visibility barcode in an image.

4. The method according to claim 1, wherein the computer readable marks are selected from the group of marks consisting of: a dot, a group of dots, a circle, a square, and a triangle.

5. The method according to claim 1, wherein the reference grid is a rectangular grid, two marks are selected from the arrangement of computer readable marks, and said step of determining the rotation center includes identifying a point located half-way between the two selected marks.

6. The method according to claim 1, wherein the reference grid is a triangular grid and said step of determining the rotation center includes assigning one of the selected marks as the rotation center.

7. The method according to claim 2, comprising the further step of:
   expanding the identified constellation to incorporate additional marks from the arrangement of computer readable marks, based on the determined spacing and orientation.

8. The method according to claim 1, comprising the further steps of:
   utilizing the identified constellation to identify the reference grid; and
   identifying the data carrying marks in the arrangement of computer readable marks, based on the identified reference grid; and
   demodulating the identified data carrying marks.

9. A computer-implemented method for identifying a constellation of alignment marks within an arrangement of computer readable marks in an image, the arrangement of computer readable marks including alignment marks and data carrying marks, wherein the alignment marks define a reference grid within the arrangement of computer readable marks and the data carrying marks are modulated with respect to the reference grid to encode data, said method comprising the steps of:
   for at least one combination of at least two marks selected from the arrangement of computer readable marks:
   (a) determining a rotation center with reference to respective positions of the selected marks in the combination;
   (b) determining rotated positions for each of the selected marks in the combination by rotating each of the selected marks by a predetermined angle about the rotation center;
   (c) locating in the arrangement of computer readable marks, for each rotated position, a mark nearest to the rotated position; and (d) identifying the selected marks in the combination and the located marks as the constellation of alignment marks, when, for at least a predetermined proportion of the rotated positions, the mark nearest to the rotated position is less than a predetermined threshold from the rotated position; and (e) storing the identified constellation for use in decoding the data carrying marks.

10. The method according to claim 9, wherein the arrangement of computer readable marks is a subset of marks forming a low visibility barcode in an image.

11. A photocopier adapted to identify a constellation of alignment marks within an arrangement of computer readable marks in a scanned image, the arrangement of computer readable marks including alignment marks and data carrying marks, wherein the alignment marks define a reference grid within the arrangement of computer readable marks and the data carrying marks are modulated with respect to the reference grid to encode data, said photocopier comprising:

a scanner for acquiring the scanned image;
a storage device for storing a computer program; and
a processor for executing the program, the program comprising:
code for selecting at least two marks from the arrangement of computer readable marks;
code for determining a rotation center with reference to respective positions of the selected marks;
code for determining rotated positions for each of the selected marks by rotating each of the selected marks by a predetermined angle about the rotation center;
code for locating in the arrangement of computer readable marks, for each rotated position, a mark having a position that is less than a predetermined threshold from the rotated position; and
code for identifying the selected marks and the located marks as the constellation of alignment marks.

12. The photocopier according to claim 11, wherein the computer program further comprises:
code for identifying the reference grid, based on the identified constellation; and
code for identifying the data carrying marks in the arrangement of computer readable marks, based on the identified reference grid; and
code for demodulating the identified data carrying marks.

13. The photocopier according to claim 12, wherein the computer program further comprises:
code for authorizing reproduction of the scanned image, based on the demodulated data carrying marks.

14. A computer readable storage medium having recorded thereon a computer program for directing a processor to execute a method for identifying a constellation of alignment marks within an arrangement of computer readable marks in an image, the arrangement of computer readable marks including alignment marks and data carrying marks, wherein the alignment marks define a reference grid within the arrangement of computer readable marks and the data carrying marks are modulated with respect to the reference grid to encode data, the program comprising:

code for selecting at least two marks from the arrangement of computer readable marks;
code for determining a rotation center with reference to respective positions of the selected marks;
code for determining rotated positions for each of the selected marks by rotating each of the selected marks by a predetermined angle about the rotation center;
code for locating in the arrangement of computer readable marks, for each rotated position, a mark having a position that is less than a predetermined threshold from the rotated position; and
code for identifying the selected marks and the located marks as the constellation of alignment marks.

* * * * *